United States Patent [19]

Otsuka et al.

[11] Patent Number: 4,635,445
[45] Date of Patent: Jan. 13, 1987

[54] AIR-CONDITIONER

[75] Inventors: Nobuo Otsuka, Kamakura; Hideo Igarashi, Fujisawa; Peter Thompson, Yokohama, all of Japan

[73] Assignee: Mitsubishi Denki Kabushiki Kaisha, Tokyo, Japan

[21] Appl. No.: 824,589

[22] Filed: Jan. 23, 1986

[30] Foreign Application Priority Data

| Feb. 20, 1985 [JP] | Japan | 60-33724 |
| Feb. 25, 1985 [JP] | Japan | 60-35832 |
| Mar. 12, 1985 [JP] | Japan | 60-50153 |
| Apr. 19, 1985 [JP] | Japan | 60-84962 |
| Apr. 19, 1985 [JP] | Japan | 60-84964 |
| May 14, 1985 [JP] | Japan | 60-104334 |

[51] Int. Cl.$^4$ .............................................. F24F 7/00
[52] U.S. Cl. ...................................... 62/158; 165/22; 236/49
[58] Field of Search ............... 236/49; 165/16, 22; 62/186, 158, 180

[56] References Cited

U.S. PATENT DOCUMENTS

| 4,347,712 | 9/1982 | Benton et al. | 236/49 X |
| 4,406,397 | 9/1983 | Kamata et al. | 236/49 X |
| 4,533,080 | 8/1985 | Clark et al. | 236/49 |

FOREIGN PATENT DOCUMENTS

| 55-14979 | 4/1980 | Japan . |
| 55-24022 | 6/1980 | Japan . |
| 55-44853 | 11/1980 | Japan . |
| 55-44854 | 11/1980 | Japan . |

Primary Examiner—William E. Wayner
Attorney, Agent, or Firm—Oblon, Fisher, Spivak, McClelland, & Maier

[57] ABSTRACT

An air-conditioning apparatus capable of regulating temperature in a plurality of rooms independently of the other by adopting a variable air quantity control system, the apparatus being constructed with heat load measuring device for detecting a temperature condition in each room by a room thermostat and measuring the heat load in the room based on the condition signals derived from the detection of the temperature condition; damper control quantity determining device for determining the degree of opening of a damper in each branched duct on the basis of the measured result of the heat load; damper control device for controlling the degree of opening of the damper on the basis of the determination by the damper control quantity determining device; device for measuring the operating conditions of the air-conditioning apparatus with signals obtained from detection of pressure and temperature within the air duct after the damper control by the damper control device; device for determining the number of revolution of an air blowing fan with the pressure signal from the operating conditions measuring device and controlling the air blowing fan based on the thus determined value; and device for determining and controlling the capacity of a compressor based on the output signals signals from the heat load measuring device and the operating conditions measuring device.

29 Claims, 29 Drawing Figures

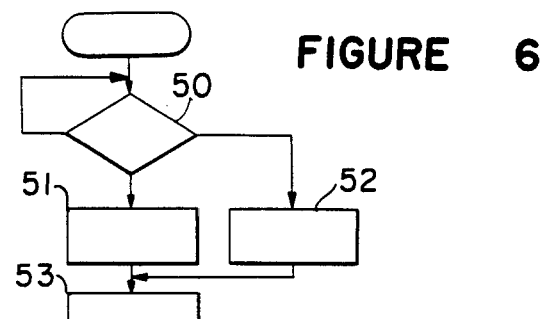
FIGURE 6
FIGURE 7
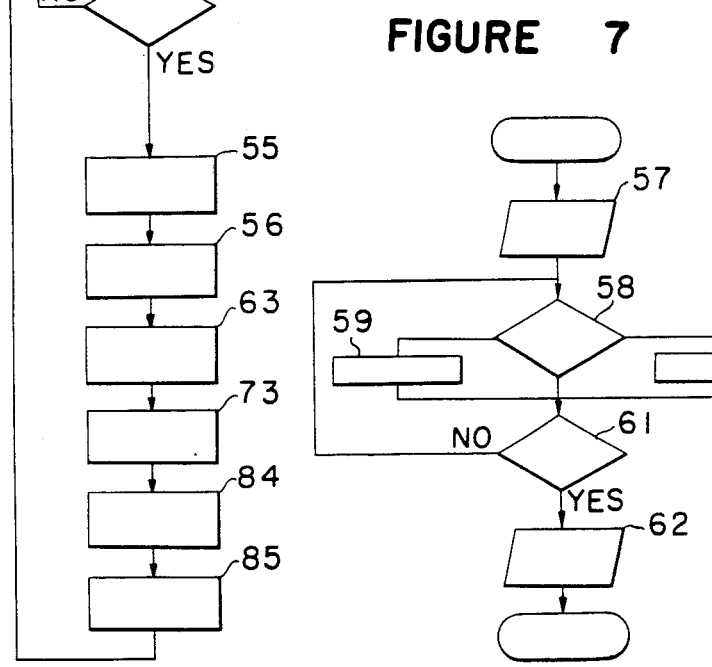

AIR-CONDITIONER

This invention relates to an air conditioner which has adopted a variable air quantity control system capable of regulating temperature in each room independently of the other.

The central air-conditioning system of a type which carries out air-conditioning by distribution of temperature-regulated air to every room through air ducts possesses various meritorious effects in comparison with the conventional heat pump chiller/fan coil system, the package air-conditioners decentralized arrangement system, and others in that it can easily incorporate therein various facilities like a humidifier, a high performance air filter for cleaning external air introduced into the system, and a total heat-exchanger, hence it is able to perform a high grade air conditioning operation, it has the least disorder in its heat transporting system, and yet it can utilize the room space with high effectiveness because the room to be air-conditioned has only an outlet port for the conditioned air, and an inlet port for the exterior air to be introduced into the room. Therefore, such centralized air-conditioning system has so far been used widely for the air-conditioning of a large-sized building. Of various centralized air-conditioning systems, the variable air quantity control system adapted to the energy-saving operations (hereinafter simply called "VAV system") is capable of controlling temperature in a plurality of rooms, each having different heat load, independently of the other, is capable of stopping the air-conditioning operation in those rooms which are not in use, is also able to reduce the running cost of the air-conditioning system by changing the power for the air blower in accordance with quantity of air to be blown out, and, at the same time, is able to decrease the capacity of the heat source apparatus by taking into consideration of the rate of its use. There are two types in the VAV system depending on the construction of the air quantity adjusting damper. The one is a system which uses a bypass type VAV unit (damper unit), wherein a ratio between the air quantity to be blown out into the room depending on the heat load of the room and the air quantity to be directly returned (or bypassed) to the heat source apparatus is adjusted. This type of the VAV system is used in most cases for the air-conditioning system utilizing the package air-conditioners which are difficult to control the capacity of its heat source apparatus, because of the air blowing quantity being kept constant, but this system has no energy-saving effect to be attained by control of the air blower. The other is a type which uses a throttle type VAV unit, wherein the quantity of air to be blown out into the room is adjusted to an arbitrary value in accordance with the heat load of the room. This VAV system is to detect a pressure in the air duct, which varies in conformity with the degree of opening of the damper, and controls the capacity of the air blower in a manner to bring this detected pressure value to a certain determined value. Therefore, when the heat load in the room decreases (that is to say, the air quantity becomes reduced, and the temperature of the air within the duct, at this time, is regulated at a constant level), the required performance of the heat source apparatus becomes reduced and the power for the air blower is also decreased.

FIG. 2 of the accompanying drawing illustrates a schematic construction of an air-conditioner to be the basis for explanation of the known art as well as the present invention. In the drawing, a reference numeral 1 designates rooms to be air-conditioned (in the illustrated case, three rooms are to be air-conditioned). A numeral 2 refers to a fan coil unit disposed in the ceiling part of the building, and which is constructed with an air-filter 3, a heat-exchanger 4 and an air blower 5. A numeral 6 refers to a main duct connected to an air outlet port of the fan coil unit 2; a reference numeral 7 designates three branch ducts diverged from the main duct 6; a reference numeral 8 indicates the throttle type VAV unit placed in one part of each of the branch ducts 7; a reference numeral 9 denotes a damper rotatably fitted within each of the VAV units 8; a numeral 10 refers to an outlet port provided at the end part of the branch duct 7; a numeral 11 refers to an inlet port provided at the lower part of a door for the room 1; a numeral 12 represents an air inlet port formed in the ceiling board above the corridor; a reference numeral 13 designates an inlet duct for communicatively connecting the inlet port at the ceiling with the inlet port of the fan coil unit 2; a numeral 14 refers to a room thermostat attached in each of the rooms 1; a numeral 15 denotes a temperature sensor disposed in one part of the main duct 6; a numeral 16 refers to a pressure sensor with its sensing part disposed in one part of the main duct 6; and a numeral 17 refers to a control device fitted on the fan coil unit 2.

In the conventional air conditioning apparatus, the degree of opening of the damper 9 is adjusted at an arbitrary position for each room in accordance with a difference between a temperature set by a user in each room through the room thermostat 14 and a temperature of the air currently detected by a temperature sensor. On account of this, the pressure in the main duct 6 changes depending on the degree of opening of the damper 9, the change of which is detected by the pressure sensor 16, thereby varying the capacity of the air blower 5 so as not to bring about an excessive pressure in the main duct. Further, since the temperature of the outlet air from the heat-exchanger 4 varies with changes in the air blowing quantity, this temperature is detected by the temperature sensor 15, on the basis of which the temperature or the circulating quantity of the heat medium to the heat-exchanger is varied so that the temperature of the air may be kept at a predetermined temperature level. In this connection, it should be understood that the heat-exchanger 4 is generally connected with a heat accumulating vessel for cold or hot water, and that the air used for the air-conditioning of the room 1 flows out of the inlet port 11, passes through a space such as the corridor, etc., and flows into the inlet port 12 in the ceiling, and further passes through the inlet duct 13 to return to the fan coil unit 2. By the way, the air blower 5 is controlled by the well known methods of the constant static pressure control method or the variable static pressure control method using an air quantity sensor.

In the illustrated construction of FIG. 2, the air used for the air-conditioning of the room is returned by use of a space such as the corridor, etc. Besides this, there may also be contemplated a system, wherein an air return duct is provided between each room 1 and the fan coil unit 2 so as to improve much more its efficiency in the control as well as in the energy-saving. Moreover, in the embodiment of FIG. 2, the ducts 7 are branched out from the main duct 6, besides which there may also be contemplated a way, in which such branched ducts are provided directly from the fan coil unit 2 in the shape of octopus legs, not by providing the main duct. Additionally, the fan coil unit 2, besides its being placed in the ceiling as shown in FIG. 2, may also be hung from the ceiling or set on the floor.

Since the conventional air-conditioner is constructed as described above, the air-conditioning system using the bypass type VAV unit lacks in its energy-saving property. Furthermore, in the air-conditioning system using the throttle type VAV unit, when a direct-expansion type heat pump is used as the heat source apparatus for a small scale air-conditioning system intended for residence, small-sized shops, etc., there have been encountered such points of problem that, since the number of rooms to be simultaneously air-conditioned is small and yet no forced ventilation is done in most cases, the heat load in each room is low, on account of which the heat source apparatus (i.e., heat pump) is difficult to be controlled at the time of such low heat load with the consequent inability to increase operational reliability of the air-conditioning apparatus.

The present invention has successfully solved the above-described various problems inherent in the conventional air-conditioning system, and aims at providing an improved air-conditioner with increased operational reliability of the heat pump without affecting whatsoever the confortability in the air-conditioned room. Such improved air-conditioning can be attained by carrying out appropriate capacity control at the time of a low heat load in the room in the air-conditioning system utilizing the heat pump as the heat source apparatus so as to secure smooth operation of the heat pump.

In order to attain such intended purpose, the air-conditioner according to the present invention is constructed with heat load measuring means for detecting a temperature condition in each room by a room thermostat and measuring the heat load in the room based on the condition signals derived from the detection of the temperature condition; damper control quantity determining means for determining the degree of opening of a damper in each branched duct on the basis of the measured result of the heat load; damper control means for controlling the degree of opening of the damper on the basis of the determination by the damper control quantity determining means; means for measuring the operating conditions of the air-conditioner with signals obtained from detection of pressure and temperature within the air duct after the damper control by the damper control means; means for determining the number of revolution of an air blower with the pressure signal from the operating conditions measuring means and controlling the air blower based on the thus determined value; and means for determining and controlling the capacity of a compressor based on the output signals from the heat load measuring means and the operating conditions measuring means.

The air-conditioning apparatus according to the present invention functions in such a manner that the heat load measuring means calculates the heat load in the room on the basis of a difference between a room temperature established by a room thermostat and a current room temperature as detected; then the degree of opening of the damper in the branch duct is determined by the damper control quantity determining means based on the heat load as calculated to control the degree of opening of the damper in accordance with this determination; thereafter, the pressure and the temperature within the duct after the damper control are detected; based on the detection signals of the pressure and the temperature, the operating conditions of the air-conditioner are measured by the operating conditions measuring means; at the same time, the number of revolution of the air blower is determined by the air blower revolution determining means based on the result of the pressure measurement and the air blower is controlled with the determined number of revolution; and the compressor capacity determining means determines the capacity of the compressor based on the measured result of the heat load measuring means and the measured result of the temperature by the operating conditions measuring means, based on the results of determination of which it controls the capacity of the compresor. With such functions of the air-conditioning system of the present invention, the temperature of the outlet air is determined by the sum of the heat load in all the rooms to be air-conditioned, and the capacity of the compressor is controlled in such a manner that the temperature in these rooms may be maintained at a constant level with the consequence that frequent on-and-off operations of the compressor can be eliminated.

Various ways of carrying out the present invention are described in detail hereinbelow with reference to drawings which illustrate several specific embodiments, in which:

FIG. 6 through 9 are respectively flow charts for explaining the operations of the control circuit shown in FIG. 5;

Figure 11:
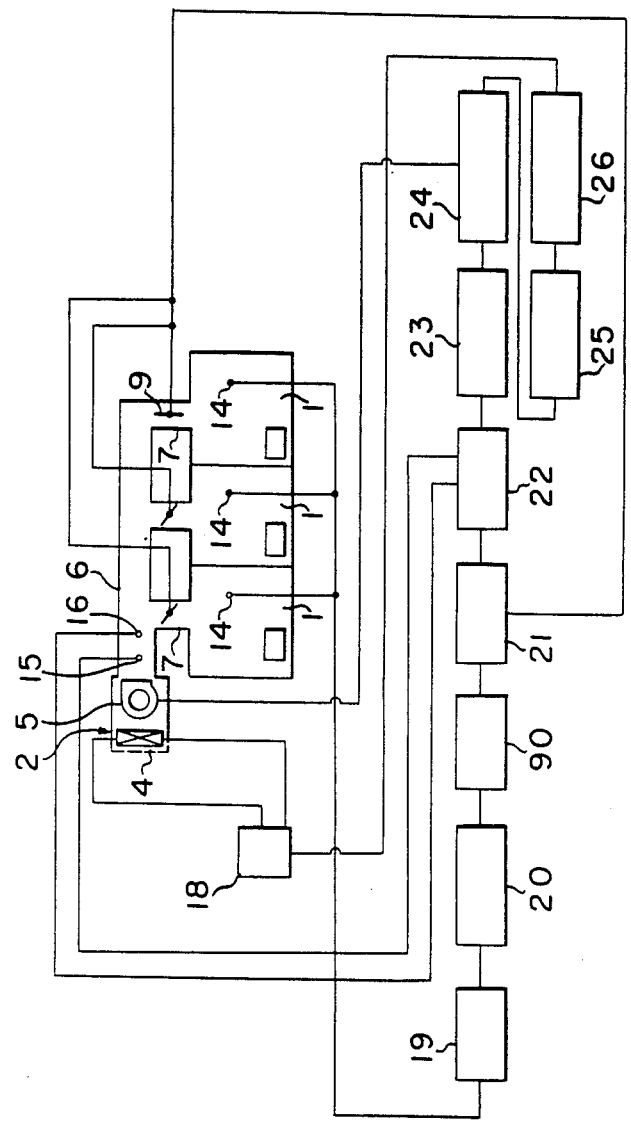
Figure 14:
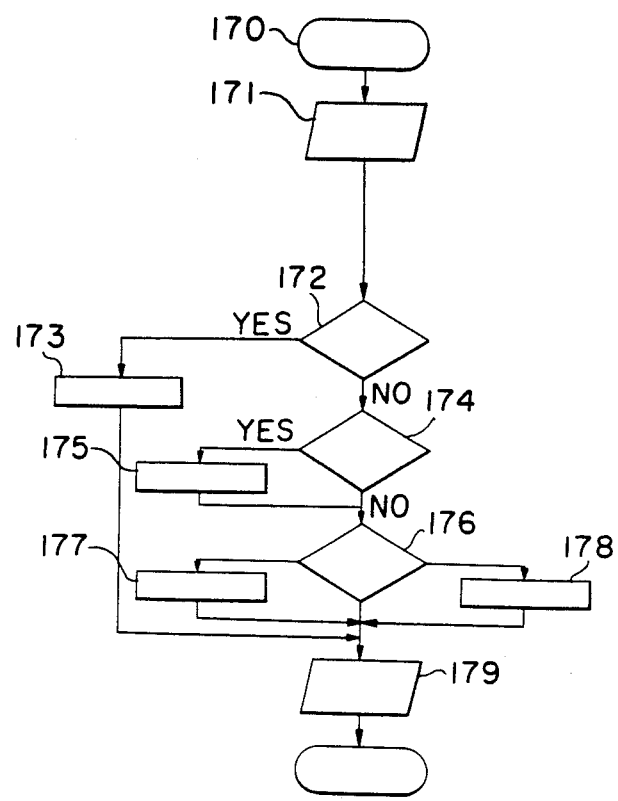
Figure 15:
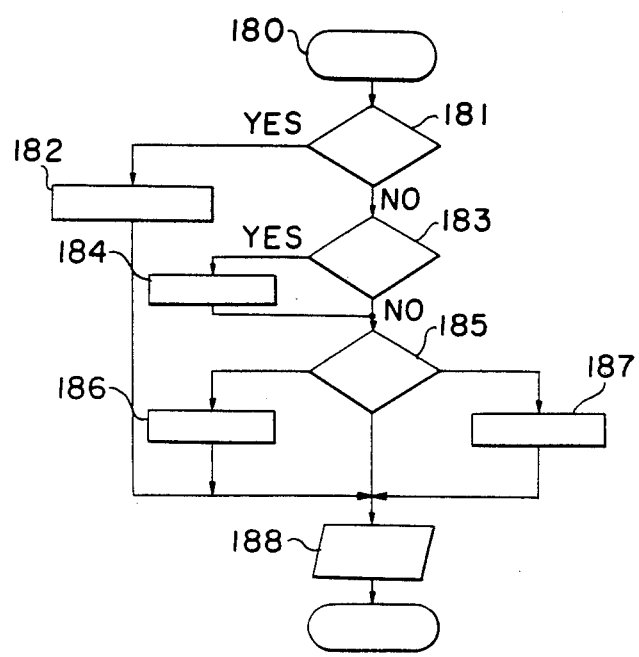
Figure 16:
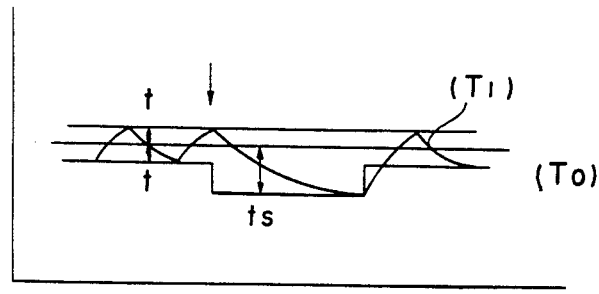
Figure 17:
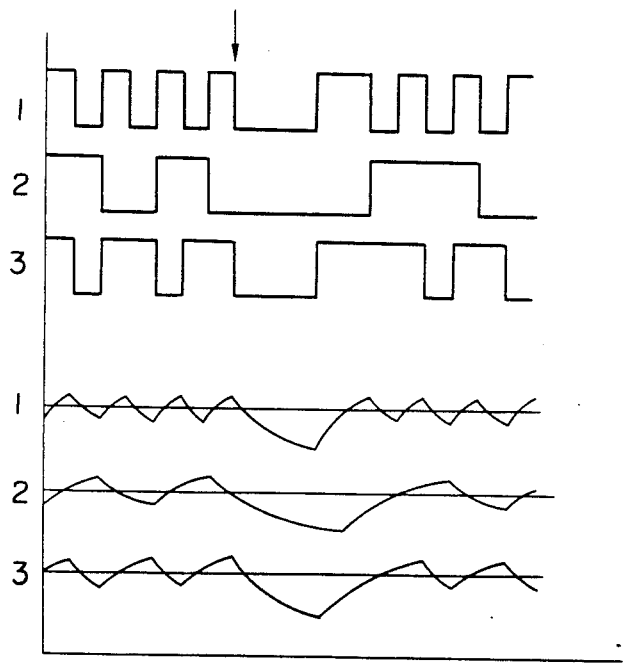
Figure 18:
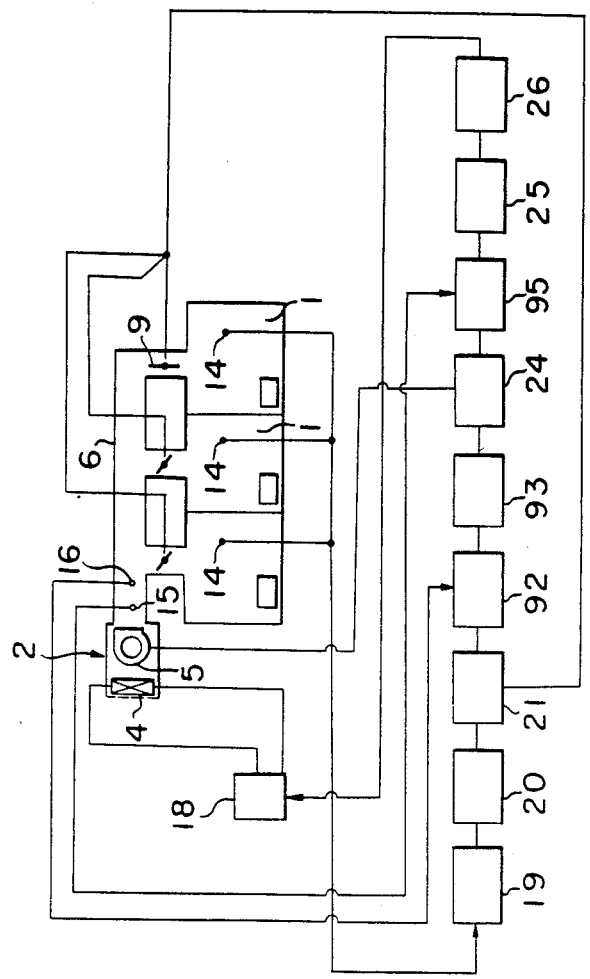
Figure 19:
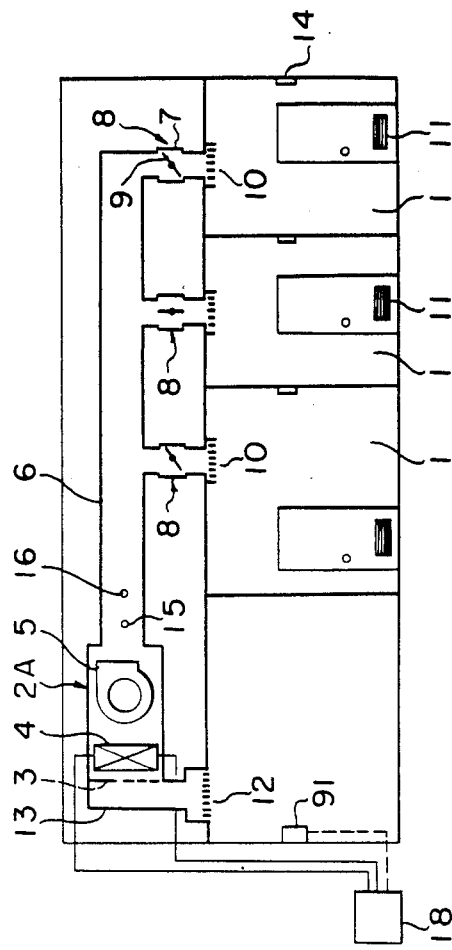
Figure 20:
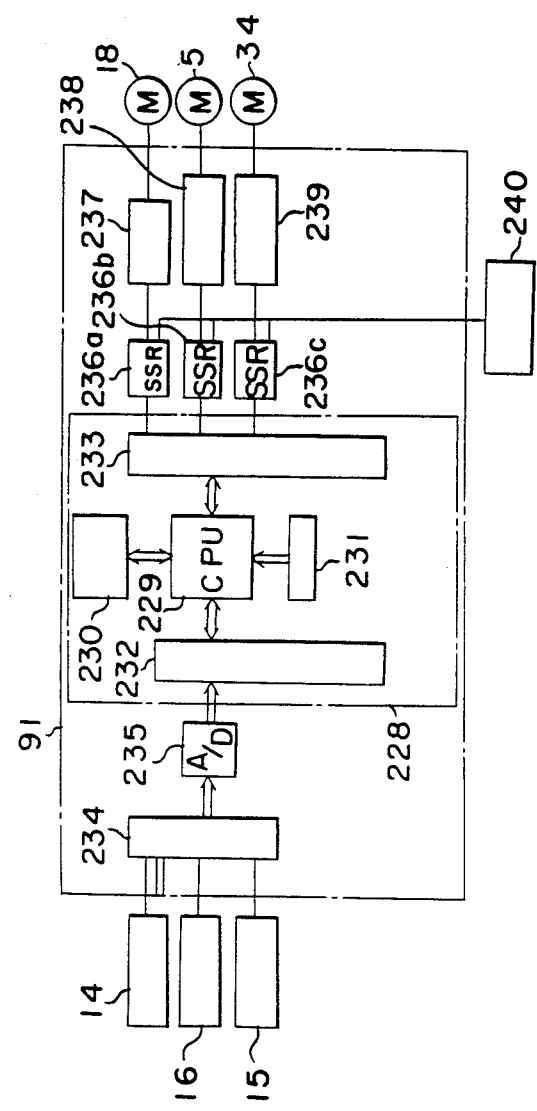
Figure 21:
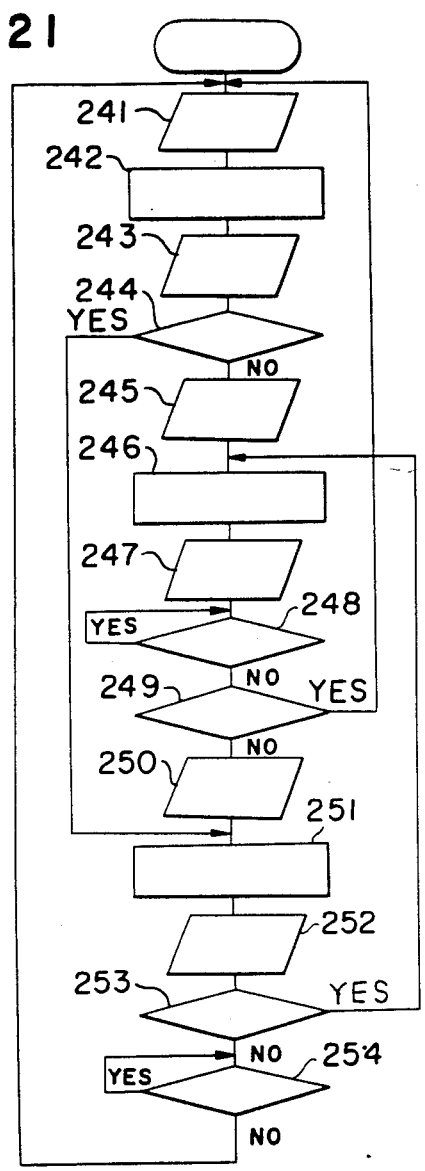
Figure 22:
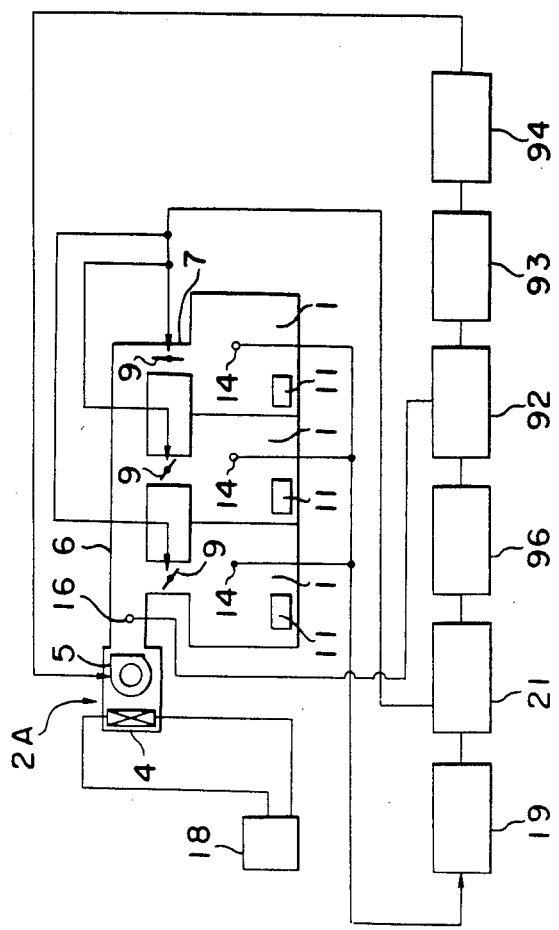
Figure 23:
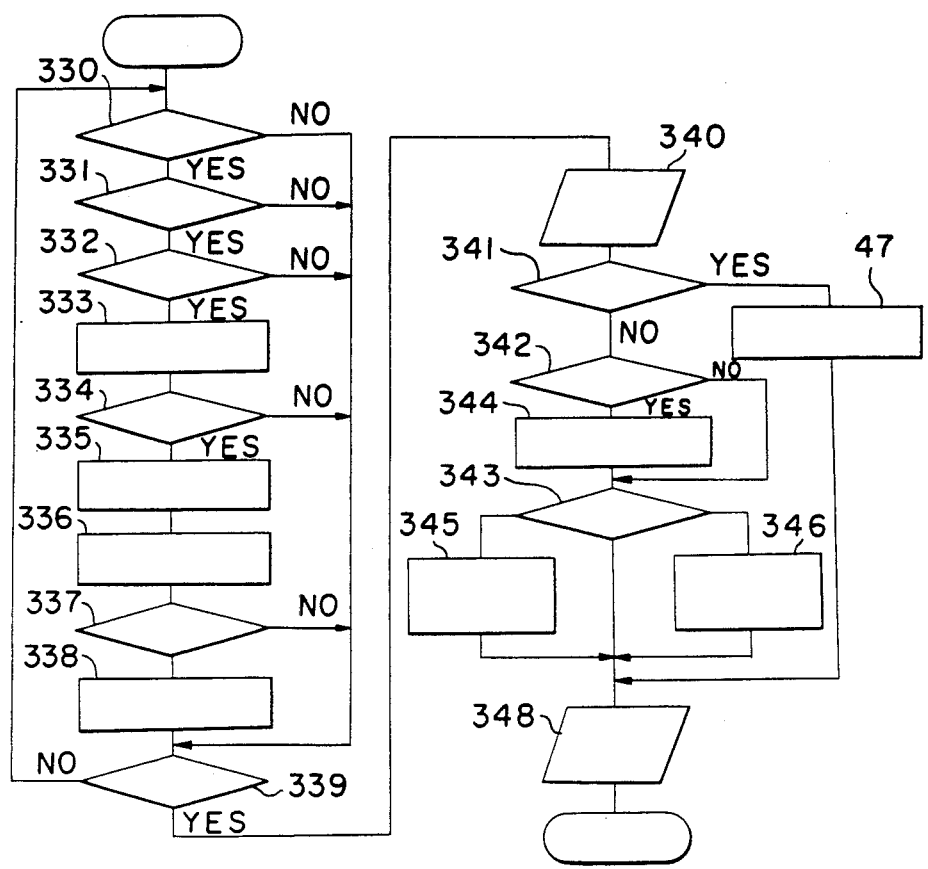
Figure 24:
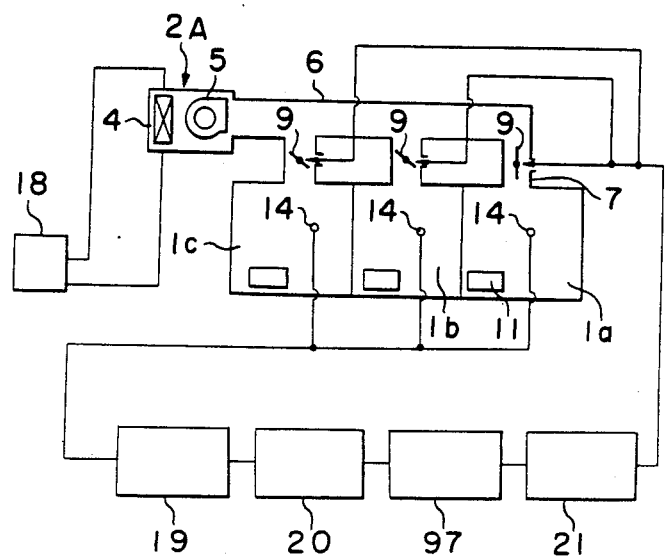
Figure 25:
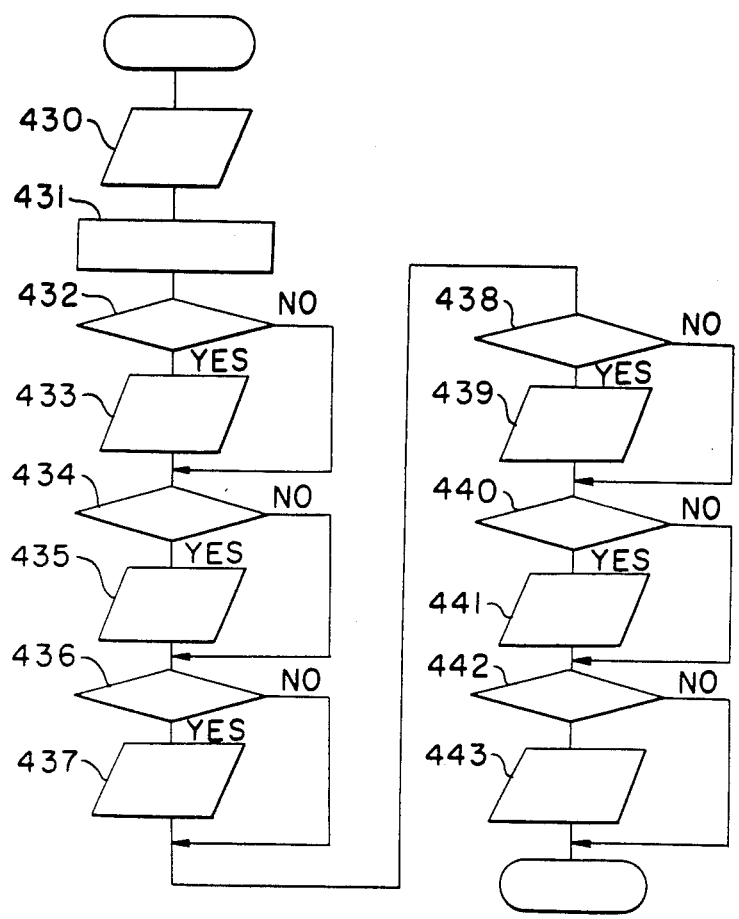
Figure 26:
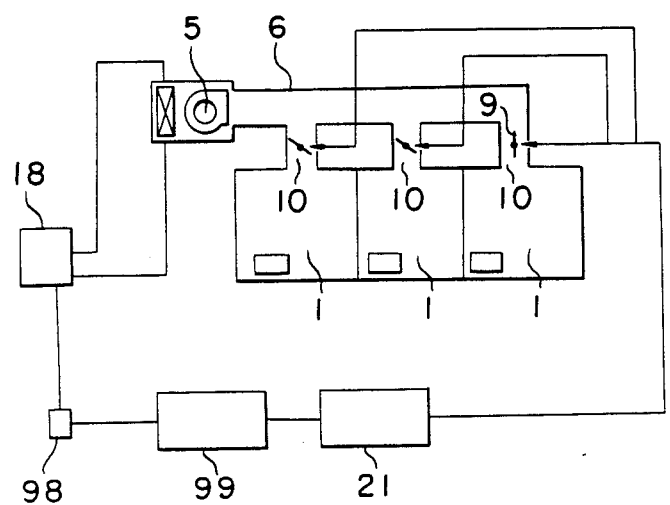
Figure 27:
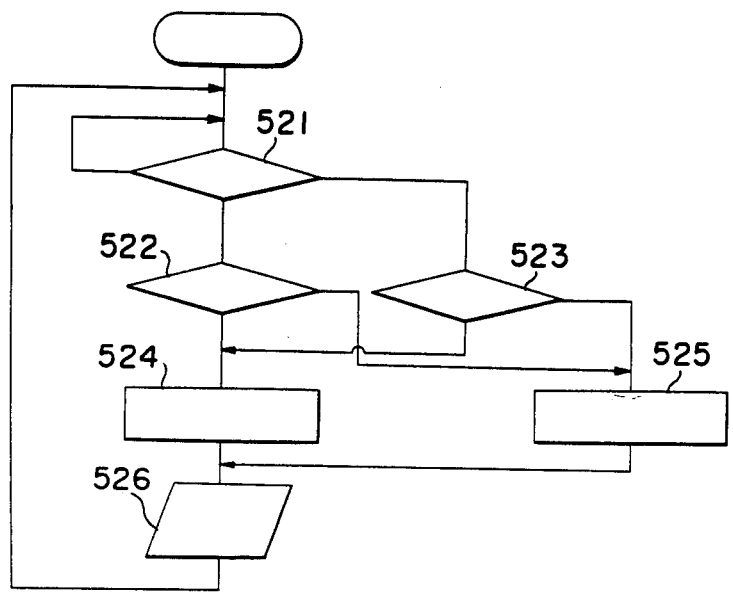
Figure 28:
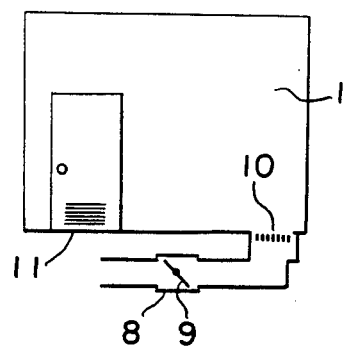

FIG. 11 is a schematic block diagram showing the principle of the second embodiment of the air-conditioning apparatus according to the present invention; FIGS. 12 through 15 are respectively flow charts for explaining the operations of control circuit shown in FIG. 5 with respect to the second embodiment of the present invention; FIGS. 16 and 17 are respectively graphical representations for explaining the damper operations with reference to the heat load and the time in accordance with the second embodiment of the present invention;

FIG. 18 is a schematic block diagram showing the principle of the third embodiment of the air-conditioning apparatus according to the present invention;

FIG. 19 is a schematic diagram illustrating an overall construction of the system utilizing the air-conditioning apparatus according to the third embodiment of the present invention, which is also related to the conventional system;

FIG. 20 is a control circuit diagram showing a concrete example corresponding to the construction of the third embodiment of the present invention;

FIG. 21 is a flow chart for explaining the operations of the air-conditioning apparatus according to the present invention as shown in FIGS. 18 to 20;

FIG. 22 is a schematic block diagram showing an overall construction of the fourth embodiment of the air-conditioning apparatus according to the present invention;

FIG. 23 is a flow chart for explanation of the control operations of the apparatus shown in FIG. 22;

FIG. 24 is a schematic block diagram showing an overall construction of the fifth embodiment of the air-conditioning apparatus according to the present invention;

FIG. 25 is a flow chart for explaining the control operations of the apparatus shown in FIG. 24;

FIG. 26 is a schematic block diagram showing an overall construction of the sixth embodiment of the air-conditioning apparatus according to the present invention;

FIG. 27 is a flow chart for explanations of the control operations of the apparatus shown in FIG. 26; and FIG. 28 is a schematic diagram showing a construction of the air outlet portion in other embodiment of the air-conditioning apparatus according to the present invention.

Figure 1:
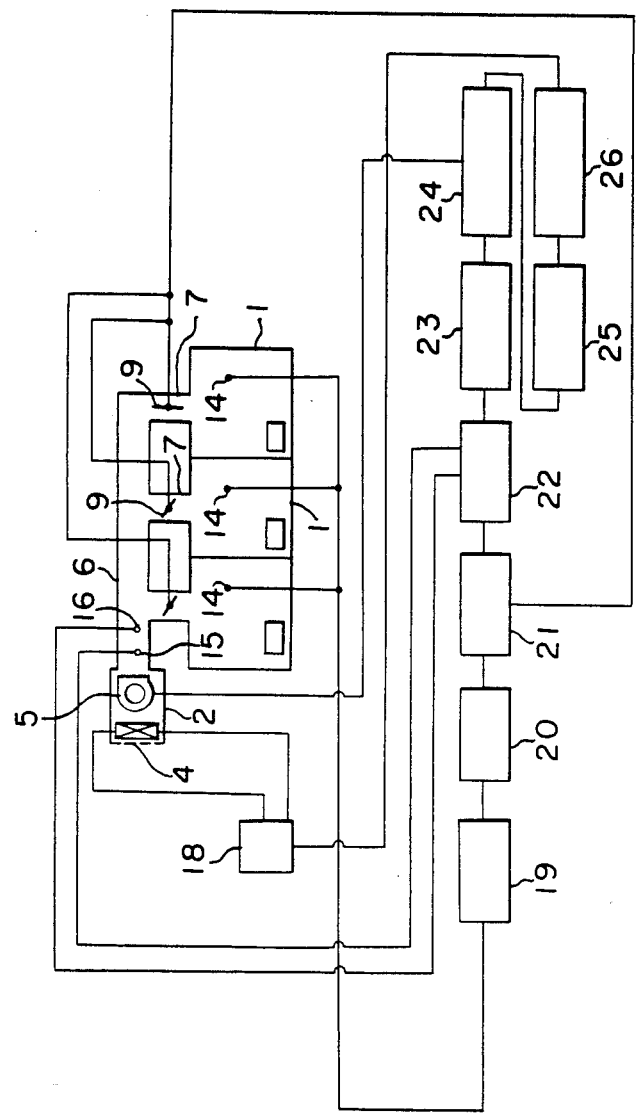
FIG. 1 is a schematic block diagram showing the principle of the air-conditioning apparatus according to the present invention.
Figure 2:
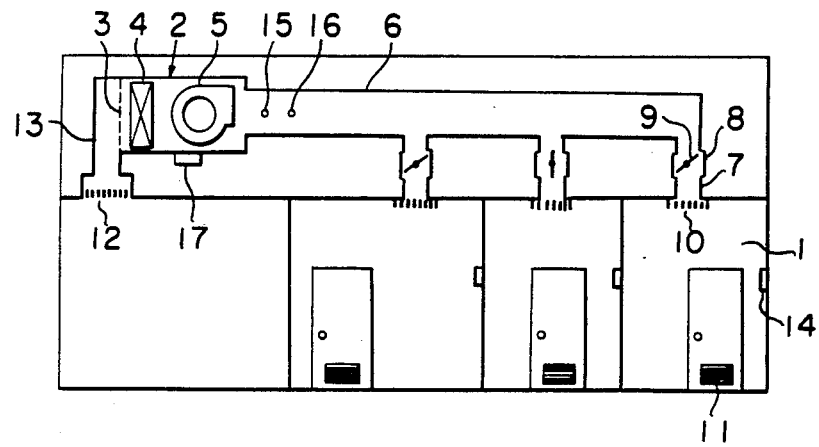
FIG. 2 is a schematic diagram illustrating an overall construction of a system utilizing the air-conditioning apparatus according to the first embodiment of the present invention, which is also related to the conventional system.

FIG. 1 of the accompanying drawing is a schematic diagram showing the principle of constructing the air-conditioning apparatus according to the first embodiment of the present invention. As is apparent from the drawing, the air-conditioner of the present invention is constructed with a heat pump 18 as the heat source apparatus, an air blower 5 for sending cool or warm air from the heat pump 18 into each of the rooms 1 through a main duct 6 and branched ducts 7, dampers 9 for regulating the quantity of the air, each of which is disposed at each of the branched ducts 7, a room thermostat 14 provided in each of the rooms 1, and a temperature sensor 15 and a pressure sensor 16 fitted in one part of the main duct 6. An output signal from each of the room thermostats 14 is made to be introduced as an input into a heat load measuring device 19 for measuring magnitude of the heat load in each of the rooms 1. A reference numeral 20 designates a damper control quantity determining device for determining a control quantity of the damper 9 on the basis of the output from the heat load measuring device 19. A numeral 21 refers to a damper control device for controlling the degree of opening of the damper 9 on the basis of the determination by the damper control quantity determining device 20. A reference numeral 22 denotes an operating conditions measuring device for measuring the operating conditions of the air-conditioner based on detection signals of the temperature and the pressure in the main duct 6 after the damper control as detected by the temperature sensor 15 and the pressure sensor 16. A reference numeral 23 represents an air blower revolution determining device for determining the optimum number of revolution of the air blower 5 on the basis of the output pressure signal as measured by the operating conditions measuring device 22, the output from this air blower revolution determining device 23 being forwarded to an air blower control device 24 for controlling the air blower 5. A reference numeral 25 designates a compressor capacity determining device for determining the optimum capacity of the heat pump (compressor) 18 based on the output temperature signal as measured by the operating conditions measuring device 22, the output from this compressor capacity determining device 25 being forwarded to the compressor capacity control device 26 for controlling the capacity of the heat pump 18.

Figure 3:
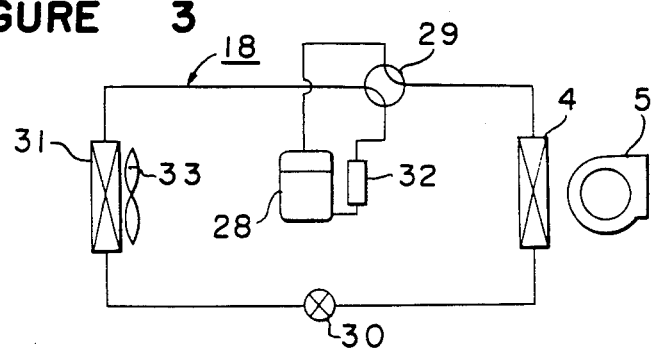
FIG. 3 is a circuit diagram of the heat pump according to the embodiment of this invention.

FIG. 3 schematically illustrates an overall construction of the above-mentioned heat pump 18, which includes a variable capacity type (variable revolution type) compressor 28, a four-way valve 29, a heat-exchanger 4 to the inner side of the room, an expansion valve 30 for carrying out flow rate control of a cooling medium by arbitrarily displacing a plunger to an arbitrary by an electromagnet, a heat-exchanger 31 to the outer side of the room, and an accumulator 32, all these component elements being connected in a circular form to construct the refrigerating circuit. Incidentally, a reference numeral 33 denotes an outdoor fan belonging to the above-mentioned heat-exchanger 31 to the outer side of the room.

Figure 4A:
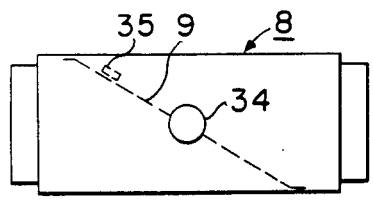
FIGS. 4A and 4B are respectively a side elevational view and a front view of the VAV unit for use in the air-conditioning system according to the present invention.
Figure 4B:
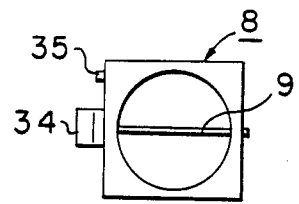

FIGS. 4A and 4B illustrate in detail the VAV unit 8 which is constructed with a damper motor 34 utilizing a stepping motor to perform its forward and reverse rotations at an arbitrary angle for the oscillatory motion of the damper 9, and a limit switch 35 to detect a position of the damper 9. The limit switch 35 is provided at the full closure position of the damper 9.

Figure 5:
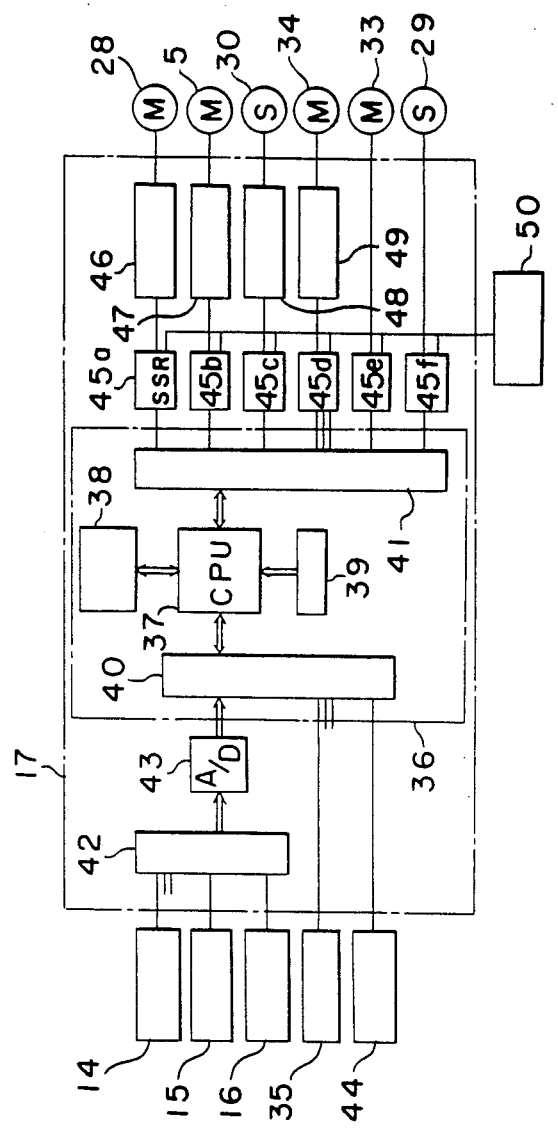
FIG. 5 is a control circuit diagram according to the first embodiment of the present invention.

FIG. 5 is a circuit diagram illustrating a concrete example of the present invention corresponding to the basic construction of the air-conditioning apparatus shown in FIG. 1. In the drawing, a reference numeral 36 designates a micro-computer provided in a control device 17, which is constructed with a central processing unit (CPU) 37, a memory 38 for storing therein results of the arithmetic operations, etc. carried out in a control program and the CPU 37, a timer 39, an input circuit 40, and an output circuit 41. A numeral 42 refers to an analog multiplexer, into which the detection outputs from the room thermostat 14, the temperature sensor 15, and the pressure sensor 16 are introduced as the inputs. A reference numeral 43 denotes an A/D converter for converting these outputs into digital signals, the digital output signals of which are forwarded to the input circuit 40. A reference numeral 44 indicates an operating switch, the condition signal from which is forwarded to the input circuit 40 together with the signal from the limit switch 35. Reference numerals 45a through 45f designates photo-couplers SSR connected to the output circuit 41 for each of the control means, wherein an inverter 46 is interposed between the photo-coupler coupler SSR 45a and the compressor 28; a thyrister controller 47 is interposed between the photo-coupler SSR 45b and the air blower 5; an expansion valve controller 48 is interposed between the photo-coupler SSR 45c and the expansion valve 30; and a damper controller 49 is interposed between the photo-coupler 45d and the damper motor 34, respectively, all being electrically connected. Further, the outdoor fan 33 is connected with the photo-coupler coupler SSR 45e, and the four-way valve 29 with the photo-coupler SSR 45f. A numeral 50 refers to an a.c. and d.c. power source for driving each and every control means.

Figure 8:
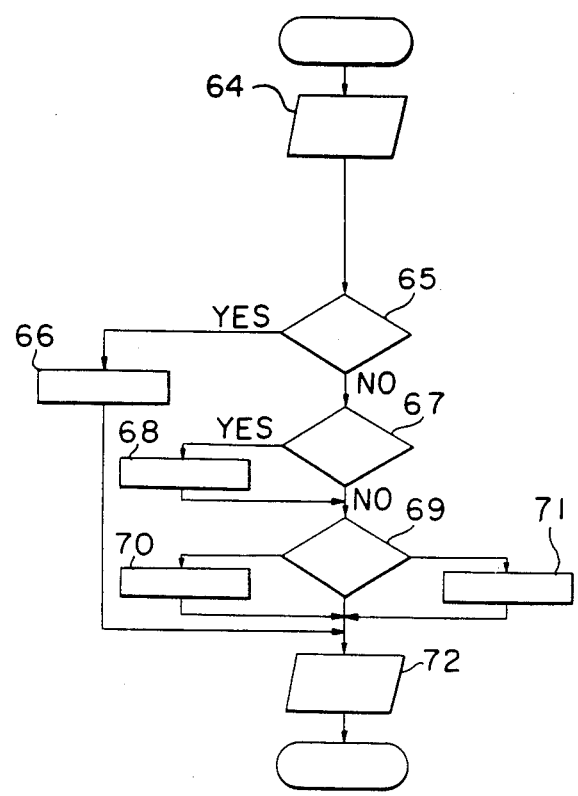
Figure 9:
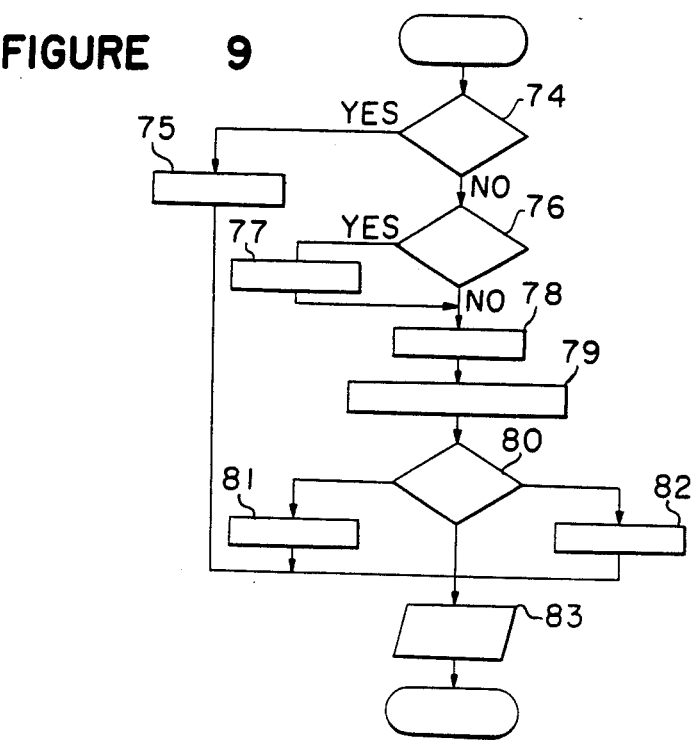

In the following, the operation of the air-conditioner according to this first embodiment of the present invention will be explained in reference to the flow charts shown in FIGS. 6 to 9, wherein FIG. 6 is the main flow chart showing the control program as stored in the memory 38 of the micro-computer 36; FIG. 7 is the sub-routine flow chart for the damper control; FIG. 8 is the sub-routine flow chart for the air blower; and FIG. 9 is the sub-routine flow chart for the compressor control.

It should be understood that the ensuing explanations on the operations of the air-conditioner will be made mainly in connection with the warming mode.

First of all, the operating switch 44 is set on the warming or cooling mode (in this case the warming mode) at the step 50, whereupon an "on" signal is input into the input circuit 40 and the apparatus starts its operation. By this actuation of the operating switch 44, a control constant required for the warming or cooling operation is supplied from the memory 38 into the CPU 37 (steps 51 and 52). Subsequently, the initial setting of each damper 9 is effected at the step 53. The damper motor 34 continues its rotation until the limit switch 35 is once actuated (to bring the damper to its full closure state), after which it sets the damper at the full open position. At this time, an accurate position of the damper 9 is stored in the memory 39. Subsequently, the operational sequence goes into an ordinary control loop, which is repeated henceforward by the timer 39 at a certain definite time interval. Initially, at the step 54, if it is judged that the operational sequence is the timer control, the sequence goes to the step 55 where "on" or "off" of the four-way valve 29 and the outdoor fan 33 is determined, on the basis of which both the four-way valve 29 and the outdoor fan 33 are controlled by the output control signals from the output circuit 41 through the photo-couplers SSR 45e and 45f. Subsequently, the operational sequence proceeds to the damper control at the step 56 where the control program as shown in FIG. 7 is executed: that is to say, the heat load measuring operation is effected at the step 57 in FIG. 7, on the basis of which output signal of a room temperature $T_0$ established by the room thermostat 14 in each room and the current temperature $T_1$ in each room are introduced into the CPU 37 by way of the analog multiplexer 42, the A/D converter 43, and the input circuit 40. Following this, the operational sequence proceeds to the damper control quantity determining operations at the steps 58 to 61. In determining the damper control quantity, the room temperature $T_0$ and the room temperature $T_1$ are first compared at the step 58, and, if $T_1$ is lower than $(T_0-t)$, it is determined that the damper 9 be brought to its full open state ($\pm t$ denotes a non-sensing region both above the below $T_0$); if $T_1$ is higher than $(T_0+t)$, it is determined that the damper 9 be brought to its full closed state (step 62); and if $T_1$ is within $(T_0\pm t)$, it is determined that the damper 9 has no change in the degree of its opening. This determination of the damper control quantity is executed for all the rooms 1, the determination of which is made at the step 61.

The results of the foregoing sequential operations are transmitted to the damper controller 49 from the output circuit 41 by way of the photo-coupler SSR 45d by the damper control output operation at the step 62 to thereby open or close the damper 9 in full degree by forward or reverse rotation of the damper motor 34. Then, the sequential operation proceeds to the indoor fan control at the step 63 in FIG. 6 where the air flow control program as shown in FIG. 8 is executed. In more detail, the operating condition measuring operation is carried out at the step 64, and output signals $T_2$ and P from the temperature sensor 15 and the pressure sensor 16, respectively, are introduced into the CPU 37 by way of the analog multiplexer 42, the A/D converter 43, and the input circuit 40. Subsequently, the operational sequence proceeds to the air blower revolution determining operation at the steps 65 to 71, wherein determination is made at the step 65 as to whether the dampers 9 are all in full closed state, or not: if they are all fully closed, the sequential operation goes to the step 66 where the air blower 5 is turned off, and the sequential operation proceeds to the step 72.

Figure 10:
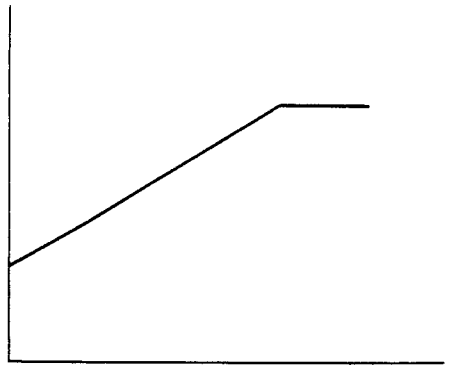
FIG. 10 is a graphical representation showing a relationship between the outlet air temperature and the total heat load in the first embodiment of the present invention.

If it is determined at the step 65 that the dampers 9 are not in full closure, determination is made at the step 67 as to whether the air blower 5 is "on" or "off". At the step 65, if it is determined that the air blower 5 is in its "off" state, the sequential operation goes to the step 68 where the air blower 5 is turned on, after which the sequence proceeds to the step 69. At the step 69, comparison is made between an established pressure $P_0$ in the main duct 6 as memorized in the memory 37 and a pressure P which has been detected at the previous step 64. If $P_0$ is greater than P, the sequence proceeds to the step 70 where the number of revolution of the air blower 5 is increased in accordance with a difference between $P_0$ and P. On the other hand, if $P_0$ is smaller than P, the sequence proceeds to the step 71 where the number of revolution of the air blower 5 is decreased in accordance with a difference between $P_0$ and P. Further, if P is present within the non-sensing region of $P_0$, the operational sequence proceeds to the next step 72 for the air blower control output operation without changing the number of revolution of the air blower 5. The control outputs from the above-described operations are forwarded from the CPU 37 to the thyrister controller 47 by way of the output circuit 41 and the photo-coupler SSR 44b, where the input signals in a.c. waveforms are controlled by the thyrister to be output to the air blower 5 for arbitrary control of its number of revolution. Thereafter, the sequential operation proceeds to the compressor control at the step 73 as shown in FIG. 6 where the compressor capacity determining operation as shown in FIG. 9 is executed. In this compressor capacity determining operation, determination is made at the step 74 as to whether the dampers 9 are all in their full closure state, or not. If they are all in the full closure state, the operational sequence proceeds to the step 75 to turn off the compressor 28, and the sequence further proceeds to the step 83. On the other hand, if the dampers are not in their full closure state, the operational sequence goes to the step 76 where determination is made as to whether the compressor 28 is in "on" or "off". If it is "off", the operational sequence proceeds to the step 77 where the compressor 28 is turned on, and then the sequence goes to the subsequent step 78. At the step 78, a sum $\Sigma (T_0-T_1)$ of differences between the established room temperature $T_0$ and the current room temperature $T_1$ of all the rooms as measured at the previous step 64 (except for those rooms not to be air-conditioned: only those room where $T_0$ is higher than $T_1$) is found. The sum corresponds to the total heat load of the entire air-conditioning system. On the basis of this sum as found, a value of the outlet air temperature of the heat-exchanger 4, i.e., the blowout air temperature $T_3$ is established at the subsequent step 79. As shown in FIG. 10, the value of $T_3$ is found from an equation of $T_3 = a * \Sigma (T_0-T_1)+b$ so that it may be established high, at the time of the warming operation, if the value of $\Sigma (T_0-T_1)$ is large, while it may be established low if the value of the sum is small. The value of the constant term b in this equation is established somewhat low to such an extent that dwellers in the room may not feel the outlet air cool. Also, the upper limit value of $T_3$ is established in such a manner that an excessive condensing pressure may be avoided, and that the coefficient of performance of the refrigerating circuit may not be lowered.

At the subsequent step 80, comparison is made between the established air temperature $T_3$ as found at the step 79 and the temperature $T_2$ as detected at the previous step 64. If $T_3$ is higher than $T_2$, the operational sequence proceeds to the step 81 where the number of revolution of the compressor 28 is increased in accordance with a difference between $T_3$ and $T_2$. On the other hand, if $T_3$ is lower than $T_2$, the operational sequence goes to the step 82 where the number of revolution of the compressor 28 is decreased in accordance with a difference between $T_3$ and $T_2$. Further, if $T_2$ is within the non-sensing region of $T_3$, the operational sequence proceeds to the next step 83 for the compressor capacity controlling operation without changing its number of revolution.

From the above-described compressor capacity determining operations, the number of revolution of the compressor 28 is so controlled that it may be large when the heat load is high, and that it may be small when the heat load is low. As the consequence of this, the heat pump 18 is operated with its capacity conforming to the heat load; in particular, the compressor 28 does not repeat its on-off operation frequently at the time of the low heat load.

The control outputs from the CPU 37 by the above-described operations are forwarded to the inverter 46 from the output circuit 41 by way of the photo-coupler SSR 45a, where the frequency and the voltage of the a.c. power source are controlled as an output to the compressor 28 for arbitrary control of the number of its revolution. The capacity of the heat pump 18 varies in accordance with the number of revolution of the compressor 28, whereby temperature of the outlet air from the heat-exchanger 4 at the indoor side is controlled. Next, the expansion valve 30 is controlled at the step 84 in accordance with the number of revolution of the compresor 28 and a temperature of the external air, and then a defrost control is further carried out at the step 85, after which the operational sequence returns to the step 54. Thereafter, this loop control operations are repeated. By the way, it should be understood that detailed explanations for the steps 84 and 85 and the safety circuit for the air-conditioning system have been dispensed with, since they have no close connection with the subject matter of the present invention.

In the above-described embodiment, the room temperature is controlled by regulating the degree of opening of the damper 9 in its full open state or in its full closure state. According to this control system, the warm air is sent into the room 1 at its maximum flow rate (i.e., at its maximum wind velocity) when the damper 9 is in the open state, while its flow rate becomes zero when the damper 9 is in the closure state, with the consequence that the temperature distribution between the upper part and the lower part of the room 1 can be rendered substantially uniform at the time of the warming operation, in particular, hence a comfortable dwelling space is secured. Besides this control system, it may also be feasible for the purpose of the present invention to adopt a throttle control system which has been employed in the conventional VAV unit. In that case, the total degree of opening of the damper 9 is set at its minimum (for example, when three VAV units are used, the minimum value for the total degree of opening is set at 50% for its open state), so that the air blower 5 and the compressor 28 stop their operations when the degree of opening becomes less than this minimum value.

Furthermore, in the above-described embodiment, the number of revolution the air blower is controlled by use of the thyrister for the air blower control means 24, although it may be feasible to carry out the control by use of the inverter as is the case with the compressor capacity control means 26.

Moreover, in the above-described embodiment, the capacity of a single unit of the compressor 28 is made variable by use of the inverter. However, when a plurality of units of compressor are used for expanding a range of the capacity control, wherein the inverter is used for such capacity control, much better capacity control can be effected in correspondence to the heat load, whereby frequency in the on-off operations of the compressor 28 can be reduced.

Although the above-described embodiment uses the heat pump as the heat source apparatus, this control system can also be applied to an air-conditioner of a type, wherein an auxiliary heating appliance such as a gas furnace, etc. is incorporated in its fan coil unit.

In addition, the above-described embodiment is so constructed that the pressure and the temperature of air within the duct are simultaneously detected, and then the operating conditions of the air-conditioning apparatus is measured by the operating conditions measuring device, on the basis of which the air blower and the compressor are controlled. It is, however, possible that the pressure alone is first detected to control the air blower, and then the air temperature is detected to control the compressor.

As described in the foregoing, the first embodiment of the air-conditioning apparatus according to the present invention is so constructed that the outlet air temperature is established in correspondence to the heat load when it is decreased, and the capacity control of the heat pump is effected in accordance with this outlet air temperature, with the consequent effects of the compressor being free from its frequent on-off operations at the time of a low heat load, hence improvement in the operating reliability of the compressor.

In the following, the second embodiment of the present invention will be explained.

The air-conditioner according to the second embodiment of the present invention is constructed with a room thermostat provided in each and every room and for detecting a temperature in such room, into which cool or warm air from a heat pump is distributed through an air feeding duct; heat load measuring means for measuring heat load in each room on the basis of an output signal from the room thermostat; damper control quantity determining means for determining the degree of opening of the damper provided in a branch duct for each room based on the measured result of the heat load; established temperature determining means for determining a change in the established temperature value by the room thermostat based on the total control quantity of each damper as determined by the damper control quantity determining means; damper control means for controlling the degree of opening of the damper based on output signal from the established temperature determining means; means for detecting the pressure and the temperature within the duct after the damper control by the damper control means, and measuring the operating conditions of the air-conditioning apparatus with the detected signals; means for determining the number of revolution of the air blower with the pressure signal from the operating conditions measuring means; means for determining capacity of the compressor with the temperature signal from the operating condition measuring means; and means for controlling the capacity of the compressor with the output signal from the compressor capacity determining means.

The air-conditioning apparatus according to the second embodiment of the present invention functions in such a manner that the heat load measuring means calculates the heat load in each room on the basis of a difference between a room temperature established by a room thermostat and a current room temperature; then the degree of opening of a damper in a branch duct is determined by the damper control quantity determining means based on the heat load as calculated; subsequently, depending on the total degree of opening of the damper as determined, a change in the established room temperature is effected by the established temperature determining means; on the basis of this determination, the damper is controlled by the damper control means; then the pressure and the temperature within the air duct after the damper control are detected, with which detection signals the operating conditions of the air-conditioning apparatus are measured by the operating conditions measuring means; at the same time, the air blower is controlled by determination of the number of revolution of the air blower by the air blower revolution determining means on the basis of the pressure signal; and finally the capacity of the compressor is controlled by determintion of its capacity by the compressor capacity determining means on the basis of the temperature signal. Through such control operations, the frequency in the on-off operations of the compressor is kept minimum.

FIG. 11 is a schematic block diagram showing the principle of constructing the air-conditioning apparatus according to the second embodiment of the present invention, in which those component elements identical with those in FIG. 1 are designated by the same reference numerals. As is apparent from the drawing, the air-conditioner of the present invention is constructed with the heat pump 18 as the heat source apparatus; the air blower 5 for sending cool or warm air from the heat pump 18 into each of the rooms 1 through the main duct 6 and the branched ducts 7; the dampers 9 for regulating the quantity of the air, each of which is disposed at each of the branched ducts 7; the room thermostat 14 provided in each of the rooms 1; and the temperature sensor 15 and the pressure sensor 16 fitted in one part of the main duct 6. An output signal from each of the room thermostat 14 is introduced as an input into the heat load measuring device 19 for measuring magnitude of the heat load in each of the rooms 1. A reference numeral 20 designates the damper control quantity determining device for determining a control quantity of the damper 9 on the basis of the output from the heat load measuring device 19. A numeral 90 refers to an established room temperature determining means for determining necessity for changing the established room temperature based on the result of determination by the damper control quantity determining means. A numeral 21 refers to a damper control device for controlling the degree of opening of the damper 9 based on the result of determination by the established room temperature determining means 90. A reference numeral 22 denotes an operating conditions measuring device for detecting a temperature and a pressure within the duct 6 after the damper control by means of the temperature sensor 15 and the pressure sensor 16, and measuring the operating conditions of the air-conditioning apparatus based on these detection signals. Further, a reference numeral 23 represents an air blower revolution determining device for determining the optimum number of revolution of the air blower 5 on the basis of the output signal of the pressure as measured by the operating conditions measuring device 22, the control device 24 for controlling the air blower 5 based on the output from the air blower revolution determining device 23 being connected to this air blower revolution determining device 23. A numeral 25 refers to a compressor capacity determining device for determining the optimum capacity of the heat pump (compressor) 18 based on the output signal of the temperature as measured by the operating conditions measuring device 22, the compressor capacity control device 26 for controlling the capacity of the heat pump 18 based on the output from the compressor capacity determining device 25 being connected to this capacity determining device 25.

Figure 12:
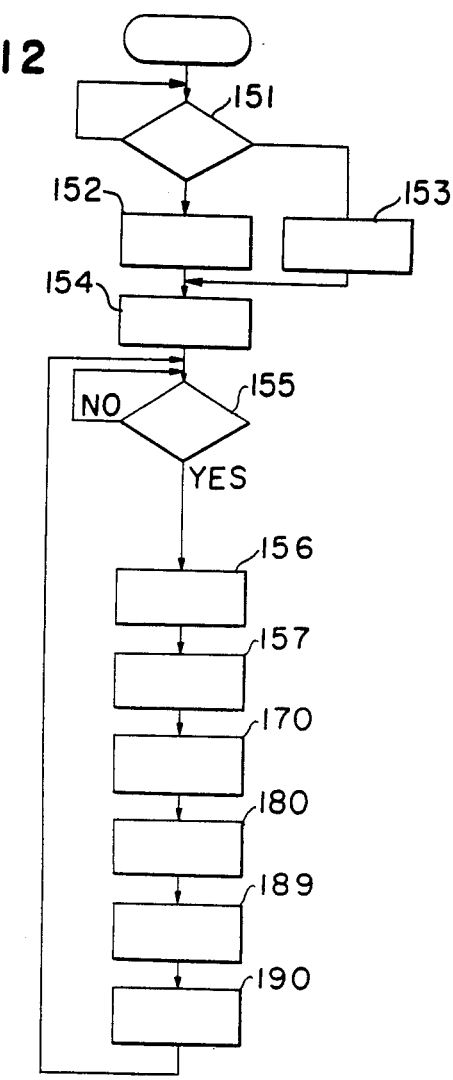
Figure 13:
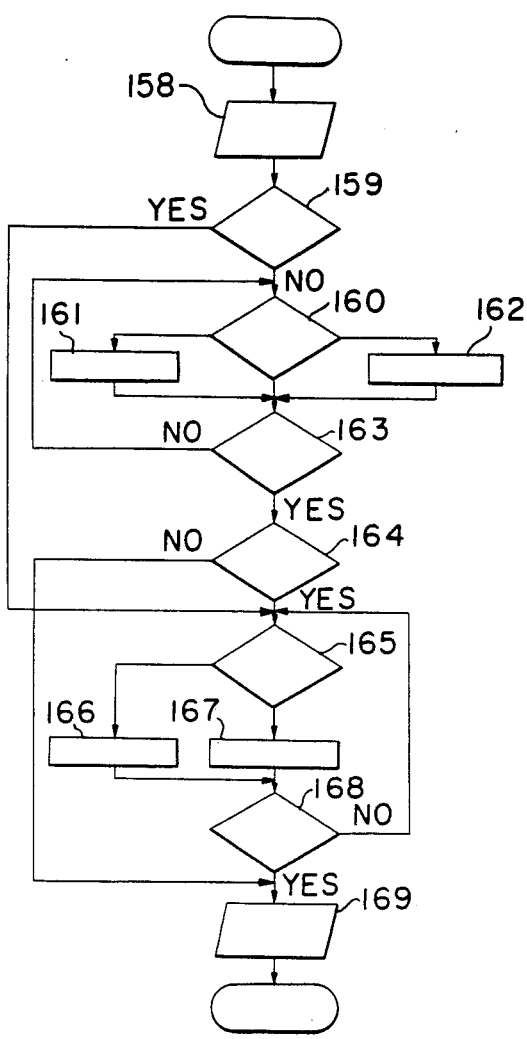

In the following, the operations of the air-conditioner according to this second embodiment of the present invention will be explained in reference to FIGS. 12 to 15, wherein FIG. 12 is the main flow chart showing the control program as stored in the memory 38 of the micro-computer 36; FIG. 13 is the subroutine flow chart for the damper control; FIG. 14 is the subroutine flow chart for the air blower control; and FIG. 15 is the subroutine flow chart for the compressor control.

It should be understood that the ensuing explanations on the operations of the air-conditioner will be made in connection with the warming mode.

First of all, the operating switch 44 is set on the warming or cooling mode (in this case, the warming mode) at the step 151, whereupon an "on" signal is input into the input circuit 40 and the apparatus starts its operation. By this actuation of the operating switch 44, a control constant required for the warming or cooling operation is supplied from the memory 38 into the CPU (steps 152 and 153). Subsequently, the initial setting of each damper 9 is effected at the step 154. The damper motor 34 continues its rotation until the limit switch 35 is once actuated (to bring the damper to its full closure state), after which is sets the damper at its full open position. At this juncture, an accurate position of the damper 9 is stored in the memory 38. Subsequently, the operational sequence goes into the ordinary control loop, which is repeated henceforward by the timer 39 at a certain definite time interval (step 155). Initially, at the step 156, the "on" or "off" state of the four-way valve 29 and the outdoor air blower 33 are determined, on the basis of which both the four-way valve 29 and the outdoor air blower 33 are controlled by the output control signals from the output circuit 41 through the photo-couplers SSR 45e and 45f. Subsequently, the operational sequence proceeds to the step 157 for the damper control where the control program as shown in FIG. 13 is executed. In more detail, the heat load measuring operation is effected at the step 158 in FIG. 13, on the basis of which output signals of a room temperature $T_0$ set by the room thermostat 14 in each room and the current temperature $T_1$ in each room are introduced into the CPU 37 by way of the analog multiplexer 42, the A/D converter 45, and the input circuit 40. Following this, the operational sequence proceeds to the damper control quantity determining operation at the steps 159 to 163. In determining the damper control quantity, determination is made at the step 159 as to whether all the dampers 9 have already been in their full closure state, or not. If they are in full closure state, the operational sequence is bypassed to the step 165 to be described later. If they are not in full closure state, the established room temperature $T_0$ by the room thermostat and the current room temperature $T_1$ are compared at the step 160. If $T_1$ is lower than $(T_0-t)$, the damper 9 is determined to be in its full open state at the step 161 ($\pm t$ denote a non-sensing region both above and below the established room temperature $T_0$). On the other hand, if $T_1$ is higher than $(T_0+t)$, the damper 9 is determined to be in its full closure state (step 162). Further, if $T_1$ is within $(T_0 \pm t)$, the damper 9 is determined to have no change in its degree of opening. The arithmetic operation in each of the steps 160 to 162 is carried out for each of the n numbers of rooms 1, the termination of which operations is determined at the step 163. When the result of the operations indicates "YES", the operational sequence proceeds into the subsequent steps 164 to 168 for the established room temperature determining operation. In this operation, if the dampers 9 have all been determined, in the previous damper control quantity determining operation at the step 164, as not being in their full closure state, the operational sequence is bypassed to the step 169. If not, i.e., in case the dampers 9 are all in their full closure state, the operational sequence goes to the step 165 where the established room temperature $T_0$ and the current room temperature $T_1$ are compared again. If $T_1$ is lower than $(T_0-t_s)$, the damper 9 is determined at the step 166 as being in its full open state ($t_s$ denotes the non-sensing region below $T_0$, and has a relationship of $t<t_s$). On the other hand, if $T_1$ is higher than $(T_0-t_s)$, the damper 9 is determined to be in its full open state at the step 167. Such determination is made for each of the entire rooms 1 (step 168). The result of the above-described determination is transmitted to the damper controller 49, at the subsequent step 169 for the damper control operation, from the output circuit 41 through the photo-coupler SSR 45d to open or close the dampers 9 to their full degree by forward or reverse rotation of the damper motor 34. Then, the operational sequence proceeds to the indoor fan control at the step 170 where the control program shown in FIG. 14 is executed. In more detail, the operating conditions measuring operation is carried out at the step 171, and the output signals $T_2$ and P from the temperature sensor 15 and the pressure sensor 16, respectively, are introduced into the CPU 37 by way of the analog multiplexer 42, the A/D converter 43, and the input circuit 40. Subsequently, the operational sequence proceeds to the air blower revolution determining operation at the steps 172 to 178. At the step 172, determination is made as to whether the dampers 9 are all in their full closure state, or not. If they are in full closure state, the air blower 5 is turned off (step 173), and the operational sequence is bypassed to the step 179. If they are not in full closure state, the operational sequence proceeds to the step 174 where determination is made as to whether the air blower 5 is "on" or "off". If it is in the "off" state, the air blower 5 is turned on at the step 175, and the operational sequence proceeds to the subsequent step 176. At the step 176, comparison is made between the established pressure within the main duct 6 as already stored in the memory 38 and the pressure P as detected at the previous step 171. If $P_0$ is greater than P, the number of revolution of the air blower 5 is increased in accordance with a difference between $P_0$ and P (step 177). On the other hand, if $P_0$ is smaller than P, the number of revolution of the air blower 5 is decreased (step 178). Further, when P is within the non-sensing region of $P_0$, the operational sequence goes into the subsequent air blower control operation at the step 179 without changing the number of revolution of the air blower. The control output from the CPU 37 is forwarded to the thyrister controller 47 from the output circuit 41 through the photo-coupler SSR 45b, where the control output in the a.c. waveform is controlled by the thyrister to be output to the air blower 5 for arbitrary regulation of the number of its rotation. Thereafter, the operational sequence goes to the compressor control at the step 180 as shown in the main control program of FIG. 12. FIG. 15 indicates the program for the processing, in accordance with which the controller capacity determining operation is effected at the steps 181 through 187. First of all, at the step 181, determination is made as to whether the dampers 9 are all in full closure state, or not. If they are in full closure state, the compressor 28 is turned off at the step 182, and the operational sequence is bypassed to the step 188. On the other hand, if they are not in full closure state, the on-off conditions of the compressor 28 is determined at the step 183. If the compressor 28 is in its "off" state, it is turned on at the step 184, after which the operational sequence proceeds to the subsequent step. At the step 185, comparison is made between the established air temperature $T_3$ within the main duct 6 as stored in the memory 38 and the temperature $T_2$ as detected at the previous step 171. If $T_3$ is higher than $T_2$, the number of rotation of the compressor 28 is increased in accordance with a difference between $T_3$ and $T_2$ (step 186). If $T_3$ is lower than $T_2$, the number of revolution of the compressor 28 is decreased (step 187). Further, if $T_2$ is within the non-sensing region of $T_3$, the operational sequence goes to the subsequent capacity control operation at the step 188 without changing the number of revolution of the compressor 28. The control output from the CPU 37 is forwarded to the inverter 46 from the output circuit 41 through the photo-coupler SSR 45a, where the frequency and the voltage of the a.c. power source are controlled to be output to the compressor 28 for arbitrary regulation of the number of its revolution. The capacity of the heat pump 18 varies in accordance with the number of revolution of the compressor 28, whereby the outlet air temperature of the heat-exchanger 4 at the indoor side is adjusted. Subsequently, the expansion valve 30 is controlled in accordance with the number of revolution of the compressor 28 and the external air temperature (step 189), then the defrost control is further carried out (step 190), and the operational sequence goes back again to the step 55; thereafter this control loop is repeated. Incidentally, it should be noted that the detailed explanations for the steps 189 and 190 as well as the safety circuit of the air-conditioning system have been dispensed with, since they are not closely related with the subject matter of the present invention.

The results of the above-described controls will be explained in reference to FIGS. 16 and 17 for explaining the damper operations with respect to the heat load and the time in accordance with the second embodiment of the present invention. For example, when a plurality of rooms 1 are to be simultaneously air-conditioned (for warming), the damper 9 is operated in its full open state, because the temperature in these rooms is lower than the established temperature value at the time immediately after commencement of the operation, so that the number of revolution of the air blower 5 and the compressor 28 is maintained at a high rate. As soon as the room temperature increases to reach the established temperature value, the damper 9 repeats its operations of full open and full closure to thereby maintain the room temperature within a range of the established temperature value $T_0 \pm t$. In this case, the quantity of air to be blown out is controlled in accordance with the total degree of opening of the plurality of dampers 9 and the temperature of the blowing air is also kept at a substantially constant level. When it happens that the degree of opening of all the dampers 9 is in their closure state, both air blower 5 and compressor 28 are temporarily turned off. Once such state emerges, any of the dampers 9 will not be open subsequently until the temperature in each room lowers to a level of $T_0 - t_s$, hence the compressor 28 and the air blower 5 will be kept in their "off" state up to such time to come. When the value of $t_s$ is taken large, the stoppage time of the compressor 28 will become longer, in contrast to which fluctuations in the room temperature becomes considerable. Therefore, the value of $t_s$ is determined in consideration of the operational reliability of the compressor 28 with its on-off state. By the way, in case only one room is air-conditioned, the room temperature always fluctuates between $T_0 - t_s$ and $T_0 + t$.

In the above-described embodiment of the present invention, the room temperature is controlled by rendering the degree of opening of the damper 9 in its full open state of full closure state. According to this method of air-conditioning, warm air is sent into the room 1 at its maximum flow rate (wind velocity) when the damper 9 is in its open state, while no air is supplied thereinto when the damper is in its closed state, with the consequence that the temperature fluctuation in the room can be kept minimum at the time of warming mode in particular and a confortable dwelling space can be secured. Besides the above-mentioned method, it is also possible to adopt in the present invention the throttle system which has so far been used in the conventional VAV unit. In this case, the minimum total degree of opening of all the plurality of dampers 9 is established (for example, when three VAV units are used, the total degree of opening thereof is set at 50% for its minimum), on the basis of which the air blower 5 and the compressor 28 are stopped and the value of $t_s$ is applied to the non-sensing region, when the degree of opening is below this established minimum value.

Also, in the above-described embodiment, the width of the non-sensing region in the established room temperature for all the rooms 1 is made variable when the dampers 9 are all in their closure state. It should however be noted that the same effect can be equally obtained by making constant the width of the non-sensing region, and making variable the established temperature per se (i.e., it is established low at the time of the warming mode, and high at the time of the cooling mode).

Further, the second embodiment of the present invention adopts the revolution control using a thyrister as the air blower control means 24. This thyrister may however be substituted by an inverter used as is the case with the capacity control means 26.

Furthermore, in the abovd-described second embodiment, the capacity of a single unit of the compressor 28 is made variable by use of the inverter. However, when a plurality of units of compressor are used for expanding a range of the capacity control, wherein the inverter is used for such capacity control, much better capacity control can be effected in correspondence to the heat load, whereby frequency in the on-off operations of the compressor 28 can be reduced.

Although the above-described second embodiment of the present invention uses the heat pump as the heat source apparatus, this control system can also be applied to an air-conditioner of a type, wherein an auxiliary heating appliance such as a gas furnace, etc. is incorporated in its fan coil unit. In addition, the above-described embodiment is so constructed that the pressure and the temperature of air within the duct are simultaneously detected, and then the operating conditions of the air-conditioning apparatus is measured by the operating conditions measuring device, on the basis of which the air blower and the compressor are controlled. It is, however, possible that the pressure alone is first detected to control the air blower, and then the air temperature is detected to control the compressor.

As described in the foregoing, the second embodiment of the air-conditioning apparatus according to the present invention is so constructed that, when the heat load decreases, the damper in each room is brought to its closure state, and the compressor is stopped its operation, the time interval until the damper will subsequently be brought to its open state is made to extend by varying the established room temperature, with the consequent effects of the compressor being made free from its frequent on-off operations at the time of a low heat load, hence improvement in the operating reliability of the compressor.

In the following, the third embodiment of the present invention will be explained.

At first, explanations will be given on the known technique relevant to this third embodiment of the invention.

The central air-conditioning system of a type which carries out air-conditioning by distribution of temperature-regulated air to each and every room through air ducts possesses various meritorious effects in comparison with the conventional heat pump chiller/fan coil system, the package air-conditioners decentralized arrangement system, and others in that it can easily incorporate therein various facilities like a humidifier, a high performance air filter for cleaning external air introduced into the system, and a total heat-exchanger, hence it is able to perform a high grade air conditioning operation, it has the least disorder in its heat transporting system, and yet it can utilize the room space with high effectiveness because the room to be air-conditioned has only an outlet port for the conditioned air and an inlet port for the exterior air to be introduced into the room. Therefore, such centralized air-conditioning system has so far been used widely for the air-conditioning of a large-sized building. Of various centralized air-conditioning systems, the variable air quantity control system adapted to the energy-saving operation (hereinafter simply called "VAV system") is capable of controlling temperature in a plurality of rooms, each having different heat load, independently of the other, is capable of stopping the air-conditioning operation in those rooms which are not is use, is also able to reduce the running cost of the air-conditioning system by changing the power for the air blower in accordance with quantity of air to be blown out, and, at the same time, is able to decrease the capacity of the heat source apparatus by taking into consideration the rate of its use.

There are two types in the VAV system depending on the construction of the air quantity adjusting damper. The one is a system which uses a bypass type VAV unit (damper unit), wherein a ratio between the air quantity to be blown out into the room depending on the heat load of the room and the air quantity to be directly returned (or bypassed) to the heat source apparatus is adjusted. This type of the VAV system is used in most cases for the air-conditioning system utilizing the package air-conditioners which are difficult to control the capacity of its heat source apparatus, because of the air blowing quantity being kept constant, but this system has no energy-saving effect to be attained by control of the air blower. The other is a type which uses a throttle type VAV unit, wherein the quantity of air to be blown out into the room is adjusted to an arbitrary value in accordance with the heat load of the room. Since this VAV system is to detect a pressure in the air duct, which varies in conformity to the degree of opening of the damper, and controls the capacity of the air blower in a manner to bring this detected pressure value to a certain determined value. Therefore, when the heat load in the room decreases (that is to say, the air quantity becomes reduced, and the temperature of the air within the duct, at this time, is regulated at a constant level), the required performance of the heat source apparatus becomes reduced and the power for the air blower is also decreased.

FIG. 19 of the accompanying drawing illustrates a schematic construction of an air-conditioning apparatus to be the basis for explanation of the known art as well as the present invention, which is similar to the central warming and cooling apparatus as shown in Japanese Unexamined Patent Publication No. 22696/1980. In the drawing, a reference numeral 1 designates rooms to be air-conditioned (in the illustrated case, three rooms are to be air-conditioned). A reference numeral 2 indicates an air handling unit disposed in the ceiling part of the building, and which is constructed with an air-filter 3, a heat-exchanger 4 and an air blower 5. A numeral 6 refers to a main air duct connected to an air outlet port of the above-mentioned air handling unit 2A; a reference numeral 7 represents three branch ducts diverged from the main air duct 6; a reference numeral 8 indicates the throttle type VAN unit placed in one part of each of the branch ducts 7; a reference numeral 9 denotes a damper rotatably mounted within each of the VAN unit 8; a numeral 10 refers to an outlet port provided at the end part of the branch duct 7; a numeral 11 refers to an inlet port provided at the lower part of a door for the room 1; a numeral 12 represents an air inlet port formed in the ceiling board above the corridor; a reference numeral 13 designates an inlet duct for communicatively connecting the inlet port at the ceiling with the inlet port of the air handling unit 2A; a numeral 14 refers to a room thermostat provided in each of the rooms 1; a numeral 15 refers to a temperature sensor disposed in one part of the main air duct 6; a numeral 16 refers to a pressure sensor with its sensing part disposed in one part of the main duct 6; a numeral 18 refers to a heat source apparatus such as a heat pump connected with the above-mentioned heat-exchanger 4; and a numeral 91 refers to a control device for controlling the heat source apparatus 18, and so forth.

In the conventional air conditioning apparatus, the degree of opening of the damper 9 is adjusted at an arbitrary position for each room in accordance with a difference between a temperature set by a user in each room through the room thermostat 14 and a temperature of the air currently detected by a temperature sensor. Also, the pressure in the main duct 6 changes depending on the degree of opening of the damper 9, the change of which is detected by the pressure sensor 16, thereby varying the capacity of the air blower 5 so as not to bring about an excessive pressure in the main air duct. Further, since the temperature of the outlet air from the heat-exchanger 4 varies with changes in the air blowing quantity, this temperature is detected by the temperature sensor 15, on the basis of which the capacity of the heat source apparatus 18 is controlled so that the temperature of the outlet air may be brought to the predetermined air temperature. As the consequence of this, the air which has been adjusted to a substantially constant temperature level is blown out of the outlet port 10 into the room 1 at a flow rate in accordance with magnitude of the heat load in the room. The air used for the air-conditioning of the room 1 flows out of the inlet port 11, passes through a space such as the corridor, etc., and flows into the inlet port 12 provided at the ceiling, and further passes through the inlet duct 13 to be returned again to the air handling unit 2A. By the way, the air blower 5 is controlled by the well known methods of the constant static pressure control method or the variable static pressure control method using an air quantity sensor.

In the illustrated construction of FIG. 19, the air used for the air-conditioning of the room is returned by use of a space such as the corridor, etc. Besides this, there may also be contemplated a system, wherein an air returning duct is provided between each room 1 and the air handling unit 2A so as to improve much more its efficiency in the control as well as in the energy-saving. Moreover, in the embodiment of FIG. 19, the ducts 7 are branched out of the main air duct 6, besides which there may also be contemplated a way, in which such branched ducts are provided directly from the air handling unit 2A in the shape of octopus legs, not by providing the main air duct. Additionally, the air handling unit 2A, besides its being placed in the ceiling as shown in FIG. 19, may also be hung from the ceiling or set on the floor. Further, it may be of a type, in which a gas furnace is incorporated.

In case the above-described air-conditioning apparatus is to be controlled by means of a micro-computer, there have so far been taken in general the following steps. Firstly, signals from the room thermostat 14, the temperature sensor 15, and the pressure sensor 16 are introduced as inputs into the micro-computer, based on which input signals the dampers 9, the air blower 5 and the heat source apparatus 18 are controlled, the control operations being repeated at a certain definite time interval. Secondly, on the basis of the signal from the room thermostat 14, the damper 9 is controlled, and then the signals from the pressure sensor 16 and the temperature sensor 15 are introduced as inputs into the micro-computer to thereby control the air blower 5 and the heat source apparatus 18. Thirdly, the damper 9 is controlled on the basis of the signal from the room thermostat 14, then the air blower 5 is controlled on the basis of the signal from the pressure sensor 16, and finally the heat source apparatus 18 is controlled on the basis of the signal from the temperature sensor 15. In passing, it should be mentioned that the pressure within the air duct 6 varies in a short time with respect to the variations in the degree of opening of the damper 9, in contrast to which the variations in temperature of the air within the main air duct 6 delays in time with respect to variations in the air flow rate owing to the heat capacity of the heat-exchanger 4. Also, the actual change in the capacity of the heat source apparatus 18 with respect to its designated capacity change would take time owing to the pipe-line system, heat capacity of the heat-exchanger 4, and so forth. In view of such factors, no favorable stability in the control can be obtained, even if the control interval is made unnecessarily short.

Since the conventional air-conditioner is constructed as described in the foregoing, any controlling method can be adopted without causing problem, if the quantity of air in the main air duct 6 is within a range capable of stably operating the heat source apparatus 18. On the other hand, however, it has a disadvantageous problems such that, in the case of, for example, a residential house of a small scale having three to six rooms, of which the number of rooms to be simultaneously air-conditioned are small, it often happens that all the dampers 9 are brought to their full closure state or almost full closure state, at which time the stable control of the heat source apparatus 18 is difficult; in particular, when a direct-expansion type package air-conditioner is used as the heat source apparatus, the pressure in the refrigerating circuit, both high and low levels, indicates transiently abnormal values.

The present invention has successfully solved the above-described various problems inherent in the conventional air-conditioning apparatus, and aims at providing an improved air-conditioning system utilizing the heat pump as the heat source apparatus thereof, which is capable of stably operating the refrigerating cycle by performing appropriate control of the heat pump at the time of a low heat load, wherein all the dampers are brought to their full closure state.

In order to attain such intended purpose, the air-conditioner according to this third embodiment of the present invention is constructed with heat load measuring means for detecting both established temperature and a current temperature in each room by means of a room thermostat, and measuring the heat load in the room on the basis of the detected signals; damper opening determining means for determining the degree of opening of the damper provided in the air duct in accordance with the results of the measurement; damper control means for controlling the damper based on the result of the determination; pressure measuring means for detecting a pressure in the air duct, and measuring the pressure based on the detected signal; air blowing quantity determining means for determining the capacity of the air blower in the air duct in accordance with the result of measuring the pressure; air blower control means for controlling the air blower based on the result of determining the air blowing quantity; temperature measuring means for detecting temperature of the air in the air duct, and measuring the temperature based on the detected signal; capacity determining means for determining the capacity of the heat source apparatus in accordance with the result of the temperature measurement; and capacity control means for controlling the capacity of the heat source apparatus based on the result of the capacity determination.

The air-conditioning apparatus according to this third embodiment of the present invention functions in such a manner that the damper opening determining means carries out the proportional control of the degree of opening of the damper to its full open state, or to its full closure state, or to its arbitrary position in proportion to a difference in the temperature between the established temperature and the current temperature in the room as measured by the heat load measuring means; the air blowing quantity determining means controls the blowing quantity of air in proportion to a difference in pressure between a pressure in the air duct and the established pressure as measured by the pressure measuring means; the capacity determining means controls the capacity of the heat pump in proportion to a difference in temperature between the air temperature value in the air duct as measured by the temperature measuring means and the established temperature value, thereby controlling the dampers, the air blower, and the heat pump capacity, in the sequence as mentioned, with a certain time interval being given between the adjacent controls, in ordinary case, so as to quickly carry out appropriate controls of the heat pump capacity and the air blower.

FIG. 18 is a schematic block diagram illustrating the principle of an overall construction of the air-conditioning apparatus according to the third embodiment of the present invention. As is apparent from FIG. 18, the air-conditioning apparatus of the present invention is constructed with the heat source apparatus, i.e., the heat pump 18; the air blower 5 for sending cool or warm air from the heat pump 18 into each of rooms 1 through the main air duct 6; the dampers 9, each being disposed at the portion of each of the branch ducts of the main air duct 6 and for regulating the quantity of the air to be blown; the room thermostat 14 provided in each of the rooms 1; and the temperature sensor 15 and the pressure sensor 16 mounted in one part of the main air duct 6. With the air-conditioner of such construction, magnitude of the heat load is measured by the heat load measuring means 19 with the detection signal from the thermostat 14 being made an input thereto; then the degree of opening of the damper is determined by the damper opening determining means 20 on the basis of the output from the heat load measuring means, followed by controlling the degree of opening of the damper 9 by the damper control means 21 based on the result of the damper opening determination; subsequently, a pressure within the main air duct 6 is measured by the pressure measuring means 92 with the detection signal from the pressure sensor 16 being made an input thereinto, based on which output signal the optimum air blowing quantity from the air blower 5 is determined; thereafter, the air blower 5 is controlled by the air blower control means 24 on the basis of the output signal from this air blowing quantity determining means; then the temperature of the air within the main air duct 6 after change of the air blowing quantity is detected by the temperature sensor 15, and measured by the temperature measuring means 95 with the detected signal being made an input thereinto; on the basis of this output, the capacity of the heat pump 18 is determined by the capacity determining means 25; and, on the basis of this output, the heat pump 18 is controlled by the capacity control means 26. when the degree of opening of the damper 9 is determined by the damper opening determining means 20 so that it may be in full closure state or almost full closure state, both capacity control and the air blower control are quickly carried out subsequent to the damper control.

FIG. 19 is a structural diagram of the air-conditioner to be used for the embodiment shown in FIG. 18, the construction having been mentioned already with respect to the conventional example.

FIG. 20 is a circuit diagram showing a concrete example of the air-conditioner according to the present invention, which corresponds to the fundamental structural diagram in FIG. 18. In the drawing, a reference numeral 228 designates the micro-computer incorporated in the control device 91, which is made up of the central processing unit (CPU) 229, the memory 230 for storing therein the control program and the results of the arithmetic operations, etc. carried out by the CPU 229, the timer 231, the input circuit 232, and the output circuit 233. A numeral 234 refers to the analog multiplexer, into which the detection signals from the room thermostat 14, the pressure sensor 16, and the temperature sensor 15 are introduced as inputs. A numeral 235 refers to the A/D converter for converting the outputs from the analog multiplexer into digital signals, the outputs therefrom being forwarded to the input circuit 232. Reference numerals 236a through 236c designate the photo-couplers SSR respectively connected to each of the control devices. More specifically, between the photo-coupler SSR 236a and the heat pump 18, there are connectively interposed the inverter 237 for controlling the heat pump; between the photo-coupler 236b and the air blower 5, there is connectively interposed the thyrister controller 238; and further, between the photo-coupler SSR 236c and the damper motor 34, there is connectively interposed the damper controller 239. Incidentally, a reference numeral 240 designates the a.c. and d.c. power source for driving each and every device.

By the way, it should be noted that, in the circuit of FIG. 20, those auxiliary devices such as the operating switch, the four-way valve, etc. for the heat pump 18 are omitted from illustration.

In the following, the operations of the above-described air-conditioner according to the third embodiment of the present invention will be explained in reference to the flow chart shown in FIG. 21.

First of all, signals for the established room temperature and the current room temperature are introduced as the inputs into the A/D converter 235 from each of the room thermostats 14 through the analog multiplexer 234, where the input signals are converted into the digital signals. Thereafter, these digital signals are forwarded into the CPU 229 through the input circuit 232, where the heat load in each room 1 is measured on the basis of a temperature difference between the established room temperature and the current room temperature (step 241). Based on the magnitude of this heat load, changing quantity of the degree of opening of the damper 9 is determined by the arithmetic operation at the following step 242. A signal for the changing quantity of the degree of opening which is proportionate to the magnitude of the temperature difference is output to the photo-coupler 236a through the output circuit 233. The actuation of the photo-coupler SSR 236a causes the damper controller 239 to actuate for adjusting the degree of opening of the damper 9 (step 243). Incidentally, there are two methods for controlling the damper 9: the one is to control the damper 9 to its full open position and its full closure position ("off" control); and the other is to set the damper 9 to its arbitrary degree of opening which is equilibrated with a heat load (proportional control). Subsequently, at the step 244, judgement is made as to whether all the dampers 9 are in their full closure state or in their almost full closure state. If they are not in their full closure state, the operational sequence proceeds to the next step 245. At this step 245, the signal from the pressure sensor 16 is taken into the CPU 229 through the multiplexer 234, the A/D converter 235, and the input circuit 232, where a difference between the pressure in the air duct 6 and the established value is measured. Based on the magnitude of this pressure difference, the changing quantity in the number of revolution of the motor for the air blower 5 is operated at the subsequent step 246, whereby the number of revolution of the motor is determined. The signal resulted from this arithmetic operation is introduced as an input into the thyrister controller 238 from the CPU 229 through the photo-coupler SSR 236b to control the gate of the thyrister, thereby regulating the voltage waveform for controlling the air blower 5 (step 247). At the subsequent step 248, a certain time interval is provided by the timer 231, after which the operational sequence proceeds to the step 249. At this step 249, judgement is made as to whether all the dampers 9 are in their full closure state, or not. If they are not in full closure state, the operational sequence goes to the subsequent step 250. At the step 250, the signal from the temperature sensor 15 is taken into the CPU 229 to measure a difference between the temperature within the air duct 6 (outlet air temperature) and the established temperature value. Based on the magnitude of this temperature difference, the changing quantity in the number of revolution of the compressor (not shown in the drawing) for the heat pump 18 is arithmetically operated, whereby the number of revolution of the compressor is determined. The data of the number of revolution of the compressor obtained by the result of this arithmetic operation are transmitted from the CPU 229 to the inverter 237, wherein the voltage and the frequency of the output from the inverter are adjusted to control the compressor (step 252). In the next place, judgement is made at the step 253 as to whether the dampers 9 are in their full closure state, or not. If they are not in full closure state, a certain time interval is given by the timer 231 at the step 254, and thereafter the operational sequence goes back again to the step 241. Incidentally, when the dampers 9 are judged, at the steps 244, 249, and 253, to be in their full closure state or almost full closure state, the sequence of controls is changed from the step 244 to the step 251; from the step 253 to the step 246; and from the step 249 to the step 241. Immediately after each damper 9 is brought to its full closure state at the step 243, the compressor is stopped at the step 252, and then the air blower 5 is stopped at the step 247. By the way, when the compessor is stopped with the damper 9 being in its almost full closure state (in case the damper control is in the proportional control mode), there still flows air within the air duct 6, hence a certain time lag may be provided between the step 253 and the step 246.

In the above-described third embodiment of the present invention, the control flow is so constructed that, in the case of the dampers 9 being all in their full closure state, the compressor may be controlled subsequent to the damper control, and then the air blower be controlled. It should, however, be noted that such control flow may be constructed in the same manner as in the ordinary control flow, provided that the controls of both air blower and compressor are carried out within a short period of time.

As described in the foregoing, the third embodiment of the air-conditioner according to the present invention possesses remarkable effects such that, at the time of a low heat load when the dampers are all brought to their full closure state, the heat pump is appropriately controlled immediately after the damper control, thereby being able to prevent the pressure and the temperature in the refrigerating circuit from varying abnormally, and that, during the ordinary operations of the apparatus, the damper, the air blower, and the capacity of the heat pump are controlled in the order as mentioned, thereby being able to secure stable operation of the refrigerating cycle.

In the following, the fourth embodiment of the present invention will be exaplained.

In view of the fact that the conventional air conditioning apparatus using the throttle type VAN unit, as shown in FIG. 19, is constructed as described in the foregoing, even when the heat load in each room is considerably different, there is no necessity for taking an accurate balance in the air quantity among the rooms to be air-conditioned by adjusting the size of the branch duct 7, the size of the outlet port 10, the air quantity regulating throttle provided in the outlet port 10, and others, but the damper 9 in the VAN unit 8 functions to automatically regulate the air quantity in accordance with the heat load in each room. However, such conventional air-conditioner had a problem such that, when the heat load is remarkably different due to difference in the outside temperature at the beginning of the season when the air-conditioning of the room become necessary, in the midst of such air-conditioning season, and at the end of the season, or when the outlet air temperature and the pressure within the air duct are always to be controlled constantly, the room temperature becomes readily equilibrated without reaching its established temperature in a relatively large room, even when the damper is brought to its full open state when the heat load becomes greatly depending on the manner of selecting the established values for the outlet air temperature and the air pressure.

The fourth embodiment of the present invention is to provide an improved air-conditioning apparatus which is capable of accurately controlling the room temperature to its established value, even when the heat load is great, by the optimum establishment of the pressure within the air duct in accordance with the magnitude of the heat load in the room.

In order to attain such intended purpose, the air-conditioner according to the fourth embodiment of the present invention is constructed with heat load measuring means for measuring the heat load in each room on the basis of the detection signals from the room thermostat; damper control means for controlling the degree of opening of the damper provided in the air duct connected to the heat source apparatus based on the result of the heat load measurement; established pressure determining means for determining the established pressure within the duct on the basis of the degree of opening of the damper and the heat load; air blower capacity determining means for determining the capacity of the air blower based on the result of the established pressure determination and an output from pressure measuring means, into which the detection signal from the pressure detector is introduced as an input thereto; and air blower control means for controlling the capacity of the air blower based on the output from the air blower capacity determining means.

The air-conditioning apparatus according to the fourth embodiment of the present invention functions in such a manner that the degree of opening of the damper is controlled by the damper control means based on the measured result by the heat load measuring means; then the established pressure within the air duct is determined by the pressure determining means in accordance with the magnitude of the heat load; and, at the same time, when the room temperature does not reach the established value even after lapse of a certain definite time, the air blowing fan is so controlled as to increasing the established pressure, whereby the room temperature can be controlled to the established value even at a large heat load.

FIG. 22 is an overall construction showing the fourth embodiment of the air-conditioning apparatus according to the present invention. As is apparent from the drawing, the fourth embodiment of the air-conditioner is constructed with the heat source apparatus 18 for generating cool or warm air; the air blowing fan 5 for conveying the cool or warm air from the heat source apparatus; the air duct 6 connected with the air handling unit 2A including the air blowing fan 5; the dampers 9 for adjusting the air quantity, each of which is disposed at each of the branched air duct parts 7 of the main air duct 6; the pressure sensor 16 for detecting the pressure within the main air duct 6; and the room thermostat 14 provided in each room. In the air-conditioner of such construction, the magnitude of the heat load is measured by the heat load measuring means 19, into which the detection signals from the room thermostats 14 are introduced as inputs; then, on the basis of the output from the heat load measuring means, the degree of opening of each damper 9 is controlled by means of the damper control means 21; the pressure value in the main air duct 6 is determined by the established pressure determining means 96 on the basis of the degree of opening of the dampers 9 and the magnitude of the heat load at that time; the capacity of the air blowing fan is determined by the air blowing fan capacity determining means 93 on the basis of the result of the established pressure determination and the output from the pressure measuring means 92 with the detection signal from the pressure sensor 16 being made the input thereto; and the capacity of the air blowing fan 5 is controlled by the air blowing fan control means 24 on the basis of the output from the air blowing fan capacity determining means 93.

In the following, the operations of the above-described air-conditioning apparatus according to the fourth embodiment of the present invention will be explained in reference to the flow chart for the warming mode control program.

It should be noted that the explanations on the capacity control of the heat source apparatus will be dispensed with, since it has no direct bearing on the fourth embodiment. This heat source apparatus 18 is so controlled that the outlet air temperature detected by the temperature sensor 15 may be brought to the established temperature level.

First of all, the detection signals from the room thermostat 14 in each room for the established temperature and the current room temperature are introduced as inputs into the heat load measuring means 19, and the heat load in each room is measured from a temperature difference between the established temperature and the current temperature. Based on the magnitude of this heat load, the degree of opening of each damper 9 is determined. When the heat load is large, i.e., when the room temperature is below the established temperature, the damper 9 is opened, while, when the heat load is zero, i.e., the room temperature exceeds the established temperature, the damper 9 is closed. By the way, there are two methods for controlling the damper 9: the one is the proportional control wherein the damper 9 is regulated to its arbitrary degee of opening in accordance with the heat load; and the other is the on-off control wherein the damper is controlled depending on whether it is in the full open state or the full closure state. Either method may be adopted for the purpose of this embodiment. Further, the damper 9 may be operated by the damper control means utilizing the stepping motor, and so forth.

Determination of the established pressure in the main air duct 6 for the air blowing fan control is executed at the steps 330 to 339 in FIG. 23. In these steps, if the room temperature in any one of the rooms 1 does not reach the established room temperature within a certain definite period of time, the established pressure is increased (in other words, by the increase in the pressure, the quantity of air increases, whereby the warming capacity becomes increased). First of all, judgement is made, at the step 330, as to whether the first room 1 is under the air-conditioning state, or not. If it is in the air-conditioning state, the operational sequence goes to the subsequent step 331. At the step 331, judgement is made as to whether the damper 9 is in its full open state or its full closure state. If it is in the full open state, the operational sequence goes to the following step 332. At the step 332, judgement is made as to whether the current room temperature which has previously been measured by the heat load measuring means 19 is lower than the established room temperature, or not. If it is lower than the established room temperature, integration of time for each room is carried out at the subsequent step 333, and further, at the following step 334, judgement is made as to whether the integrated time for each room continued over 30 minutes in succession, or not. If the integrated time is longer than 30 minutes, the integrated time is cleared at the next step 335, and the change in the established pressure is effected at the step 336. In other words, the established pressure value which was automatically set at the start of the operation is changed to a value represented by $P_0=P_0+A$. At the subsequent step 337, judgement is made as to whether a newly established pressure value $P_0$ exceeds the upper limit value $P_0$ max, or not. If the upper limit value is exceeded, the value $P_0$ is set to the upper limit value of $P_0$max at the following step 338. When the negative judgement ("NO") is given at each of the steps 330, 331, 332, 334 and 337, the operational sequence proceeds to the step 339. At the step 339, judgement is made as to whether the computation has been completed for each room 1, or not. If it has not yet been completed, the operational sequence returns to the previous step 330, where the computation for the next room is done. Upon completion of the computation for all the rooms, the operational sequence goes to the subsequent step 340. At the step 340, an input pressure signal is introduced from the pressure sensor 16 for measurement of the current pressure within the main air duct 6. At the next step 341, judgement is made as to whether the damper 9 are all in their full closure state or in their state approximate to the full closure state which exceeds the operating limit of the compressor. If they are not in the full closure state, judgement is made at the subsequent step 342 as to whether the air blowing fan 5 is currently in operation, or not. If it is in operation, the operational sequence proceeds to the following step 343. On the other hand, if the air blowing fan is in stoppage, the measures are taken at the step 344 so as actuate the same, after which the operational sequence proceeds to the step 343. At the step 343, a comparison is made between the values P and $P_0$. If the $P_0$ is greater than P, the number of revolution of the air blowing fan 5 is increased in accordance with a difference between $P_0$ and P (step 345). If $P_0$ is smaller than P, the number of revolution of the air blowing fan 5 is decreased (step 346). Further, if P is within the non-sensing region of $P_0$, no change is made to the number of revolution of the air blowing fan 5, but the operational sequence proceeds to the subsequent step 348. At the above-described step 341, if the dampers 9 are all in their full closure state, the air blowing fan 5 is stopped its operation (step 347), and the operational sequence proceeds to the step 348. At the step 348, there is carried out control of the number of revolution of the air blowing fan 5 by means of a controller such as thyrister, and so on. The above-described control operations are repeated at a certain definite time interval. Incidentally, where there are two rooms at the same time, the temperature of which does not reach the established room temperature within 30 minutes, in spite of the dampers 9 being brought to their full open state, the operational sequence passes the step 336 for two times with the result that the initial value $P_0$ is changed to $P_0=P_0+2A$. Furthermore, where there is a room 1, the temperature of which has not yet reached the established temperature during a time period of from 30 minutes to 560 minutes, the value of A is further added to $P_0$.

In the above-described fourth embodiment, the value of A to be added to the established pressure is made a constant. It should, however, be noted that this value A may be made a variable which is proportionate to a difference between the established room temperature and the current room temperature, or a variable which is proportionate to a temperature of the external air.

Moreover, in the above-described fourth embodiment, the pressure measuring means 21 is positioned after the established pressure determining means 20, although a reverse to the above may also be feasible.

Additionally, in the above-described fourth embodiment, the capacity of the air blowing fan 5 is controlled by controlling the number of its revolution with the thyrister, although the other control means may be employed equally.

Furthermore, at the step 334 of the operational sequence, the judgement of the integrated time is set at 30 minutes, although it may be set at any optimum value depending on the capacity of the heat source apparatus 18, the area to be air-conditioned, and so on.

As described in the foregoing, since the fourth embodiment of the air-conditioner according to the present invention is so constructed that the means for determining the pressure within the main air duct in accordance with magnitude of the heat load so as to be able to provide an appropriate air feeding quantity to each room, it becomes possible that the room temperature is accurately controlled even under a large heat load, and that the air blowing fan is operated with a small conveying power under a small heat load.

In the following, the fifth embodiment of the present invention will be explained. At first, explanations will be given as to the conventional technique relative to this fifth embodiment.

In the conventional air conditioning apparatus shown in FIG. 19, the degree of opening of the damper 9 is adjusted at an arbitrary position for each room in accordance with a difference between a temperature set by a user through the room thermostat provided in each room and a current air temperature detected by a temperature sensor. Also, since the pressure in the main air duct 6 changes in accordance with the degree of opening of the damper 9, the pressure sensor 16 detects this change in the pressure, depending on which detection the capacity of the air blowing fan 5 is varied so that the pressure in the main duct may not become excessive. Further, since the outlet air temperature the heat-exchanger 4 varies with changes in the air blowing quantity, this temperture is detected by the temperature sensor 15, on the basis of which the capacity of the heat source apparatus 18 is controlled so that the temperature of the air may be brought to a predetermined temperature level. As the consequence of this, the air which has been adjusted to a substantially constant temperature is blown out of the outlet port 10 into the room 1 at the air quantity in accordance with amgnitude of the heat load in the room, and the air which has air-conditioned the room 1 flows from the inlet port 11 to the ceiling inlet port 12 passing through a space such as the corridor, etc., and returns to the air handling unit 2A by way of the inlet duct 13. By the way, the air blowing fan 5 is controlled by the well known methods of the constant static pressure control method or the variable static pressure control method using an air quantity sensor.

In the illustrated construction of FIG. 19, the air used for the air-conditioning of the room is returned by use of a space such as the corridor, etc. Besides this, there may also be contemplated a system, wherein an air return duct is provided between each room 1 and the air handling unit 2A so as to improve much more its efficiency in the control as well as in the energy-saving. Furthermore, in the embodiment of FIG. 19, the ducts 7 are branched out of the main air duct 6, besides which there may also be contemplated a way, in which such branched ducts are provided directly from the air handling unit 2A in the form of octopus legs, not by providing the main air duct. Additionally, the air handling unit 2A, besides its being placed in the ceiling as shown in FIG. 19, may also be hung from the ceiling or set on the floor. Further, it may be of a type, in which a gas furnace is incorporated.

Since the conventional air-conditioning apparatus using the throttle type VAN unit is constructed as described in the foregoing, the room temperature goes up by the warming operation, in case the air outlet port 10 is provided in the ceiling surface or in the upper part of the wall surface. When this temperature value becomes closer to the established temperature value of the room thermostat 14, the damper 9 is brought to a closure state, whereby the air quantity from the outlet port 10 is reduced and the air blowing velocity also slows down. As the result of this, the warm air from the outlet port 10 no longer comes down closer to the floor surface, and the warm air goes upward to stay at the ceiling surface to remarkably differentiate the temperatue between the upper part of the room and the lower part thereof, thereby decreasing confortability in the room. Incidentally, in the cooling mode, the temperature difference between the upper and lower parts of the room does not become so remarkable, even if the outlet air quantity decreases. As such, the air-conditioning system using the throttle type VAN unit has the disadvantage of the temperature distribution in the room becoming considerably irregular between the upper and lower parts thereof depending on the season. Further, when the damper is operated to its open or closure state depending on the magnitude of the heat load, the total air quantity is temporarily restricted at the time of the damper operation, because no consideration is given to the sequence of the control operation, with the consequent problem of the pressure within the main air duct increasing abnormally.

The fifth embodiment of the present invention has successfully solved the above-described points of problem, and aims at providing an improved air-conditioning apparatus which is capable of increasing the outlet air quantity by the on-off operations of the dampers to thereby ameliorate the temperature distribution in the room and to suppress the fluctuations of the pressure in the duct to the minimum.

In order to attain such intended purpose, the fifth embodiment of the present invention is constructed with heat load measuring means for detecting the established temperature and the current temperature in each room by the room thermostat and estimating the heat load on the basis of the detected signal; damper opening determining means for determining the degree of opening of the damper in the air duct connected to the heat source apparatus in accordance with the result of the estimation; operating order determining means for determining the order of operation of each damper based on the determination for the degree of opening of the damper; and damper control means for controlling the degree of opening of the damper based on the determination of the operating order.

This fifth embodiment of the present invention functions in such a manner that the degree of opening of the damper, with which the full-open or full-closure control of the damper in each room is carried out by estimation of the magnitude of the heat load by the heat load measuring means, is determined by the damper opening determining means, and the damper operating order determining means determines the operating order in such a manner that the damper to open may be operated in preference, thereby ameliorating the temperature distribution in the room and reducing the pressure fluctuation within the air duct.

FIG. 24 is a schematic block diagram showing the entire construction of the air-conditioning apparatus according to the fifth embodiment of the present invention. As is apparent from the drawing, the air-conditioner is constructed with the heat source apparatus 18 for generating cool or warm air; the air blowing fan 5 for conveyingg the cool or warm air from the heat source apparatus; the duct 6 connected with the air handling unit 2A including the air blowing fan 5; the air quantity regulating damper 9 disposed at the branch duct portion 7 of the main air duct 6; and the room thermostat 14 provided in each of the rooms, wherein the magnitude of the heat load is measured by the heat load measuring means 19 with the detection signal from the room thermostat 14 as the input thereinto, then the degree of opening of the damper 9 is determined by the damper opening determining means 20 based on the output from the heat load measuring means 19, thereafter the operating order of each damper is determined by the operating order determining means 97 based on the result of determination by the damper opening determining means, and finally the degree of opening of the damper is controlled by the damper control means 21 based on the result of determination by the operating order determining means 97.

In the following, the operations of the above-described embodiment of the air-conditioner will be explained in reference to the flow chart for the control program as shown in FIG. 25. Incidentally, it should be noted that explanations for the air quantity from the air blowing fan 5 for controlling the capacity of the heat source apparatus 18 will be dispensed with, as it has no direct bearing on the fifth embodiment of the present invention.

First of all, signals from each room thermostat 14 on the established room temperature and the current room temperature are introduced as inputs into the control device, and the heat load in the room is estimated from a temperature difference between them (step 430). Based on the magnitude of this heat load, the degree of opening of the damper 9 is determined at the subsequent step 431. In this case, if the heat load is large, the damper 9 is determined to be in its full open state. If the heat load is small or nil, the damper is determined to be in its full closure state. At the following step 432, judgement is made as to whether the damper 9 for the room 1a has its degree of opening as determined at the above-mentioned step 431, or not. If it is in full open state, the operational sequence proceeds to the following step 433. At the step 433, the damper 9 for the room 1a is controlled to be in its full open state, if it has so far been in full closure state; on the contrary, it is kept continuously in its full open state, if it has so far been in the full open state, when the damper 9 for the room 1a is brought to its full closure state, the operational sequence proceeds from the step 432 to the step 434. These sequential operations are carried out in the same manenr as indicated in the steps 434 to 437 for each of the rooms 1b and 1c, after which the operational sequence proceeds to the subsequent step 438. At the step 438, judgement is made by the damper opening determining means 20 as to whether the damper 9 for the room 1a is brought to its full closure state, or not. If it is to be brought to its full closure state, the operational sequence proceeds to the following step 439. At the step 439, the damper 9 for the room 1a is controlled to be in its full closure state, if it has so far been in its full open state; on the contrary, it is kep continuously in its full closure state, if it has so far been in its full closure state. When the damper 9 is in its full open state at the step 438, the operational sequence proceeds to the step 440. These sequential operations are carried out in the same manner as indicated in the step 440 to 443 for each of the rooms 1b and 1c, after which the operational sequence returns to the step 430.

While the oscillatory motion of the damper 9 can be done by use of the stepping motor, etc., it will usually taken one to a few seconds for controlling it from the full open state to the full closure state, or vice versa. However, since the damper operating order is so set that preference may be given to the opening operation in the damper operating order as in the program sequence of FIG. 25, there is no possibility of the air quantity being temporarily restricted during the damper operations and the pressure within the main air duct 6 increasing considerably. In the following, one example of the damper operation will be illustrated, wherein the room 1b is controlled from its open state to its closure state, and the room 1c is controlled from its closure state to its open state.

In the case of no preference given to the open control:

Room 1a ... closure →[closure]→closure →closure

Room 1b ... open →open →[closure]→closure

Room 1c ... closure →closure →closure →[open]

In the case of preference given to the open control:

Room 1a ... closure →closure →[closure]→closure

Room 1b ... open →open →open →[closure]

Room 1c ... closure →[open]→open →open

As mentioned in the foregoing, the fifth embodiment of the present invention is so constructed that the dampers are controlled to their full open state or full closure state depending on the magnitude of the heat load in the rooms, and preference is given to the opening operation of the damper, in the operating order thereof, to be controlled to its open state, afer which the damper for the closure operation is actuated. As the consequence of this, the air quantity to be blown out into the room becomes its maximum or zero; in either case, the temperature distribution in both upper and lower parts of the room being favorable; and, morevoer, since there takes place no restriction to the total air quantity even temporarily at the time of the damper operation, there is no possibility of the pressure in the main air duct increasing abnormally, thereby being able to carry out stable operation in the air course.

In the following, the sixth embodiment of the air-conditioner according to the present invention will be explained.

First of all, explanations will be given as to the points of problem in the conventional technique relative to the sixth embodiment of the present invention. Since the conventional air-conditioner using the VAV unit as shown in FIG. 19 is constructed as mentioned in the foregoing, the room temperature increases by the warming operation, in case the outlet port 10 is provided in the ceiling surface or in the upper part of the wall surface. When the room temperature comes closer to the established temperature value of the room thermostat 14, the damper 9 is throttled and the air quantity from the outlet port 10 decreases, hence the blowing velocity of the air is also reduced.

As the result of this, the warm air from the outlet port 10 does not come closer to the floor surface, but it stays on the ceiling surface due to the draft effect to increase the difference in temperature between the upper and the lower parts of the room, thereby reducing confortability.

Incidentally, at the time of the cooling operation, since there is no draft effect, the temperature difference between the upper part and the lower part of the room does not become large, even if the outlet air quantity reduces. On the other hand, in case the outlet port 10 is in the floor surface or in the lower part of the wall surface, if the outlet air quantity is restricted at the time of the cooling operation, the cool wind does not longer come closer to the ceiling surface with the consequence that the temperature difference in the upper part and the lower part of the room becomes considerable.

On the contrary, during the warming operation, the difference in temperature between the upper part and the lower part of the room is small, even if the air quantity becomes reduced. As such, the air-conditioning system using the throttle type VAV unit has its point of problem such that the temperature distribution in the upper part and the lower part of the room becomes deteriorated depending on the season.

The sixth embodiment of the air-conditioner according to the present invention has been made with a view to solving such point of problem inherent in the conventional apparatus, and aims at providing an improved air-conditioning apparatus which provides a substantially uniform temperature distribution in both upper and lower parts of the room, thereby ameliorating confortability in the room.

In order to attain the intended object, the air-conditioning apparatus according to the present invention is provided with the damper control means, by which cool or warm air from the heat source apparatus is distributed into each room by means of the air blowing fan and the air duct, wherein the damper control method is selected by the damper control method selecting means on the basis of the established signal from the operating switch, and the degree of opening of the damper is controlled by the control method as selected.

In this sixth embodiment of the present invention, the damper control method selecting means functions to choose the damper control method in either the "on-off" control or the proportional control based on the operating mode of the operating switch for the warming or cooling mode and the established signal for the position of the outlet port.

FIG. 26 is a schematic block diagram showing the overall construction of the sixth embodiment of the air-conditioner according to the present invention. As is apparent from the drawing, the air-conditioner according to this sixth embodiment is constructed with the heat source apparatus 18 for generating cool or warm air; the air blowing fan 5 for conveying the cool or warm air from the heat source apparatus 18; the main air duct 6 connected to the air blowing fan 5; the dampers 9 for the air quantity regulation, each being disposed at the branched portion of the main air duct; and the operating switch 98 for change-over of the heat source apparatus 18 from the warming mode to the cooling mode, or vice versa, wherein, with the established signal from the operating switch 98 as an input, the damper control method is selected by the damper control method selecting means 99 from either the "on-off" control method or the proportionate control method, and the degree of opening of the damper 9 is controlled by the damper control means 21 on the basis of the result of the damper control method selection.

In the following, the operations of the air-conditioner according to the sixth embodiment of the present invention will be explained in reference to FIG. 27. Incidentally, it should be noted that the explanations for the capacity control of the heat source apparatus 18 and the air quantity control of the air blowing fan 5 are dispensed with, because they have no direct bearing on the present invention.

First of all, at the start of the operation, the operating switch 98 is set in either "off" or "warm mode" or "cool mode" (step 521). In the same manner, the outlet port position switch of the operating switch 98 is set in either the ceiling surface or the floor surface (steps 522, 523). The setting of the outlet port position may be done only once at the time of installation of the air-conditioning apparatus.

When the operating switch is set to the warming mode/floor surface or the cooling mode/ceiling surface at the steps 521 to 532, the operational sequence proceeds to the step 524 for the damper proportional control. At this step, a value proportionate to a difference in temperature between the current room temperature as detected by the room thermostat in each room 1 and the established room temperature given to the room thermostat is established as the varying quantity of the position of the damper 9.

When the operating switch 98 is set to the warming mode/ceiling surface or the cooling mode/floor surface, the operational sequence proceeds to the damper on-off operation at the step 525. At this step, if the current room temperature satisfies the established temperature, the position of the damper 9 is brought to its full closure state, and when there is a difference of a certain value and above between the current room temperature and the established temperature, the damper 9 is established at its full open position.

Based on the value as established at these steps 524 and 525, a control output is produced to the motor for the damper 9 at the subsequent step 526. As the driving motor for the damper 9, there may be used the stepping motor which is capable of performing the forward and reverse rotation, and of stopping at an arbitrary position.

In the above-described control operations, when the outlet port 10 is, for example, in the ceiling surface for the warming, the damper 9 repeats its on-off operation to control the room temperature at the established value. When the damper 9 is in its full open state, the warm air is blown out of the outlet port 10 at its maximum air quantity, and such air reaches near the floor surface.

On the other hand, when the damper 9 is in its full closure state, the air quantity becomes zero, and the air current in the room provokes the natural convection so as to reduce the temperature difference. As the result of this, in either case of the damper 9 being in its full open state or in its full closure state, the temperature difference between the upper part and the lower part of the room becomes small, whereby a confortable dwelling space can be obtained.

Further, at the cooling mode, the damper 9 carries out the proportional control operation to thereby blow out from the outlet port 10 the cool air commensurate with the heat load. This cool air, even if the wind velocity is low, comes down near the floor surface owing to a difference in the specific gravity between it and the air in the room with the consequent decrease in the temperature difference between the upper part and the lower part of the room.

In the embodiment shown in FIG. 19, the outlet port 10 is positioned in the ceiling surface, but, in some cases, it may be positioned in the floor surface as shown in FIG. 28. In this instance, the damper 9 carries out the proportional control operation at the time of the warming, while it performs the on-off control operation at the time of the cooling. When the air quantity is restricted by the proportional control operation of the damper at the time of the warming mode, the warm air does not directly reach the upper part of the room 1, but, owing to the natural convection, the temperature distribution between the upper part and the lower part of the room becomes uniform.

Moreover, at the time of the cooling mode, if the damper 9 is in its full open state by the on-off control operation, the cool air is blown up near the ceiling surface at the maximum air quantity, on account of which there is no possibility of the user's foot alone being cooled.

Furthermore, when the direction of the louver provided in the outlet port 10 is varied from season to season, much more uniformity can be realized in the temperature distribution and the air current distribution.

As has been explained in the foregoing, since the sixth embodiment of the present invention is so constructed as to controlling the damper to perform the on-off operation or to carry out the proportional operation, the temperature distribution in the upper part and the lower part of the room can be made substantially uniform throughout the seasons, thereby being able to maintain the confortable dwelling space.

We claim:

1. An air-conditioner, which comprises in combination: a heat pump; an air blowing fan and air passage ducts for distributing air as heated or cooled by said heat pump to each of rooms to be air-conditioned; air quantity adjusting dampers, each being disposed in a branched duct connected to said air passage duct for each room; heat load measuring means for measuring the heat load in each room based on the condition signals from a room thermostat provided in said each room; damper control quantity determining means for determining the degree of opening of the damper based on the output from said heat load measuring means; damper control means for controlling the degree of opening of said damper based on the output from said damper control quantity determining means; a pressure detector for detecting a pressure within said air duct after the damper control; a temperature detector for detecting air temperature within said air duct after the damper control; operating condition measuring means for measuring the operating condition of the air-conditioner based on the detection signals from said detectors; air blowing fan revolution determining means for determining the number of revolution of said air blowing fan based on the output from said operating condition measuring means; air blowing fan control means for controlling the number of revolution of the air blowing fan based on the output from said air blowing fan revolution determining means; capacity determining means for determining a value of a temperature of air to be blown based on the output from said heat load measuring means, and then determining the capacity of said heat pump based on the determined temperature value and the output from said operating condition determining means; and capacity control means for controlling the capacity of said heat pump based on the output from said capacity determining means.

2. An air-conditioner according to claim 1, wherein said damper control means is provided with established room temperature determining means for determining changes in the established value of said room thermostat based on the total control quantity of each damper as determined by said damper control quantity determining means, and the degree of opening of said each damper is controlled on the basis of the output from said established room temperature determining means.

3. An air-conditioner according to claim 1, wherein said capacity determining means establishes an outlet air temperature in accordance with the sum of the difference between the established temperature and the current temperature in each room, and the capacity of the heat pump is so determined that the outlet air temperature may be brought to said established value.

4. An air-conditioner according to claim 1, wherein said heat load measuring means measures a temperature difference between the established room temperature set by a user and the current room temperature, on the basis of which it calculates the heat load in the room.

5. An air-conditioner according to claim 1, wherein the degree of opening of the damper is determined or controlled by said damper control quantity determining means and said damper control means to either zero percent or 100%.

6. An air-conditioner according to claim 1, wherein the degree of opening of said damper is determined or controlled to an arbitrary degree of opening by said damper control quantity determining means and said damper control means.

7. An air-conditioner according to claim 2, wherein, when the total degree of opening of each damper as determined by said damper control quantity determining means becomes zero percent or below the minimum established value, said established room temperature determining means temporarily increases the width of the upper and lower limit of a non-sensing region of the established room temperature to the low temperature side at the time of the warming mode and to the high temperature side at the time of the cooling mode.

8. An air-conditioner according to claim 2, wherein, when the total degree of opening of each damper as determined by said damper control quantity determining means becomes zero percent or below the minimum established value, said established room temperature determining means temporarily decreases the established room temperature to a low level at the time of the warming mode, and increases the same to a high level at the time of the cooling mode.

9. An air-conditioner according to claim 1, wherein said air blowing fan revolution determining means determines the number of revolution of the air blowing fan in a manner to maintain substantially constant the pressure within the air duct in conformity to a predetermined pressure value.

10. An air-conditioner according to claim 1, wherein an inverter is used for said air blowing fan control means.

11. An air-conditioner according to claim 1, wherein a thyrister is used for said air blowing fan control means.

12. An air-conditioner according to claim 1, wherein said capacity determining means determines the capacity of said heat pump in a manner to maintain substantially constant the temperature of air within said air duct in conformity to a predetermined temperature value.

13. An air-conditioner according to claim 1, wherein an inverter which makes variable the number of revolution of the compressor is used for said capacity control means.

14. An air-conditioner according to claim 1, wherein an inverter and a control of a number of unit of the compressor are used in combination for said capacity control means.

15. An air-conditioner according to claim 1, wherein said heat load measuring means, said damper control quantity determining means, said established room temperature determining means, said operating condition measuring means, said air blowing fan revolution determining means, and said capacity determining means are all realized by a micro-computer.

16. An air-conditioner, which comprises in combination: a heat pump; an air blowing fan and an air duct for distributing air which has been heated or cooled by said heat pump into each of rooms to be air-conditioned; an air quantity adjusting damper for each room, which is disposed at a branched portion of said air duct; heat load measuring means for measuring a heat load in each room based on the established temperature signal and the detected temperature signal by a room thermostat provided in each room; damper opening determining means for determining the degree of opening of said damper based on the output from said heat load measuring means; damper control means for controlling the degree of opening of the damper based on the output from said damper opening determining means; pressure measuring means with a detection signal from a pressure sensor as the input thereinto for detection of a pressure within said air duct; air blowing quantity determining means for determining a capacity of the air blowing fan based on the output from said pressure measuring means; air blowing fan control means for controlling an air blowing quantity based on the output from said air blowing quantity determining means; temperature measuring means with a detection signal from a temperature sensor as an input thereinto for detection of a temperature of air within said air duct; capacity determining means for determining the capacity of said heat pump based on the output from said temperature measuring means; and capacity control means for controlling the capacity of said heat pump based on the output from said capacity determining means, wherein the damper control, the air blowing quantity control, and the capacity control are usually carried out, in the order as mentioned, with an appropriate time interval being provided among said controls, and, only when said dampers are all brought to their full closure state or almost full closure state by said damper control determining means, both capacity control and air blowing quantity are quickly carried out, subsequent to the damper control.

17. An air-conditioner according to claim 16, wherein thr degree of opening of the damper is determined by said damper opening determining means to either zero percent or 100 percent of the degree of opening.

18. An air-conditioner according to claim 16, wherein the degree of opening of the damper is determined by said damper opening determining means so as to attain an arbitrary degree of opening.

19. An air-conditioner according to claim 16, wherein said air blowing quantity determining means determins the air blowing quantity in a manner to maintain substantially constant a pressure within said air duct in confirmity to a predetermined pressure value.

20. An air-conditioner according to claim 16, wherein said capacity determining means determines the capacity of said heat pump in a manner to maintain substantially constant a temperature of air within said air duct in conformity to a predetermined temperature value.

21. An air-conditioner according to claim 16, wherein said heat load measuring means, said damper opening determining means, said pressure measuring means, said air blowing quantity determining means, said temperature measuring means, and said capacity determining means are all realized by a micro-computer.

22. An air-conditioner, which comprises in combination: a heat source apparatus; an air blowing fan and an air duct for distributing cool or warm air from said heat source apparatus into each of the rooms to be air-conditioned; dampers for controlling room temperature by varying the air quantity to be blown into each room, each of said dampers being disposed at a branched portion of said air duct; heat load measuring means for measuring a heat load with the established temperature signal and the detected temperature signal from a room thermostat in each room as the inputs thereinto; damper control means for controlling the degree of opening of the dampers based on the outputs from said heat load measuring means; established pressure determining means for determining an established pressure within said air duct based on the outputs from said damper control means and said heat load measuring means; pressure measuring means with the output from said established pressure determining means and the detected signal from a pressure sensor within said air duct as the inputs thereinto; air blowing fan capacity determining means for determining the capacity of said air blowing fan based on the output from said pressure measuring means; and air blowing fan control means for controlling the air blowing fan based on the output from said air blowing fan capacity determining means.

23. An air-conditioner according to claim 22, wherein said established pressure determining means increases the established pressure, when the room temperature in any of the rooms to be air-conditioned does not reach the established temperature level even after lapse of a certain time period.

24. An air-conditioner according to claim 23, wherein said air blowing fan control means adjusts the number of revolution of the air blowing fan.

25. An air-conditioner, which comprises in combination: a heat source apparatus for generating cool or warm air; an air blowing fan and an air duct for distributing cool or warm air from said heat source apparatus into each of the rooms to be air-conditioned; dampers for controlling temperature in each room by their full open or full closure operations, each of said dampers being disposed at each branched portion of said air duct; heat load measuring means for estimating the heat load in each room based on the input signals of the established temperature and the detected temperature from a room thermostat provided in each room; damper opening determining means for determining the degree of opening of said dampers based on the output from said heat load measuring means; operating order determining means for determining the order of operation of said each damper based on the result of determination by said damper opening determining means; and damper control means for controlling the degree of opening of said dampers based on the output from said operating order determining means.

26. An air-conditioner according to claim 25, wherein said operating order determining means determines the order of operation of said each damper in a manner to give preference to the opening operation for the damper in each room which carries out the full open or full closure operation.

27. An air-conditioner, which comprises in combination: a heat source apparatus for generating cool or warm air; an air blowing fan and an air duct for distributing cool or warm air from said heat source apparatus into each of rooms to be air-conditioned; air quantity adjusting dampers, each being disposed at each branch duct of said air duct; an operating switch for performing the change-over operation of the cooling mode and the warming mode in said heat source apparatus; damper control method selecting means for selecting either of the on-off control and the proportional control of said dampers with the established signal from said operating switch as the input thereinto; and damper control means for controlling the degree of opening of said dampers based on the output from said damper control method selecting means.

28. An air-conditioner according to claim 27, wherein said damper control method selecting means selects the on-off control at the time of the warming mode, and the proportional control at the time of the cooling mode, when the outlet port for the cool or warm air is disposed in the ceiling surface or in the upper part of the wall surface.

29. An air-conditioner according to claim 27, wherein said damper control method selecting means selects the proportional control at the time of the warming mode, and the on-off control at the time of the cooling mode, when the outlet port for the cool or warm air is disposed in the floor surface or in the lower part of the wall surface.

* * * * *